(12) United States Patent
Yang et al.

(10) Patent No.: US 12,309,642 B2
(45) Date of Patent: May 20, 2025

(54) INDICATION OF OPERATING CONFIGURATION PRIORITIES

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/357,470

(22) Filed: Jun. 24, 2021

(65) Prior Publication Data
US 2021/0410013 A1 Dec. 30, 2021

Related U.S. Application Data

(60) Provisional application No. 63/045,004, filed on Jun. 26, 2020.

(51) Int. Cl.
| | | |
|---|---|---|
| *H04W 72/10* | (2009.01) | |
| *H04W 28/02* | (2009.01) | |
| *H04W 28/20* | (2009.01) | |
| *H04W 28/24* | (2009.01) | |
| *H04W 72/0453* | (2023.01) | |

(Continued)

(52) U.S. Cl.
CPC ....... *H04W 28/20* (2013.01); *H04W 28/0268* (2013.01); *H04W 28/24* (2013.01); *H04W 72/0453* (2013.01); *H04W 72/23* (2023.01); *H04W 72/56* (2023.01)

(58) Field of Classification Search
CPC . H04W 28/20; H04W 28/0268; H04W 28/24; H04W 72/0453; H04W 72/23; H04W 72/56; H04W 72/20; H04W 28/18; H04W 47/76; H04W 47/80; H04L 47/76; H04L 47/80; H04L 47/805
See application file for complete search history.

(56) References Cited

U.S. PATENT DOCUMENTS

| | | |
|---|---|---|
| 7,525,970 B2 | 4/2009 | Mangin et al. |
| 9,516,549 B1 | 12/2016 | Aksu |
| 9,763,159 B2 | 9/2017 | Sang et al. |

(Continued)

*Primary Examiner* — Atique Ahmed
(74) *Attorney, Agent, or Firm* — Guang Y. Zhang; Holland & Hart LLP

(57) ABSTRACT

Methods, systems, and devices for wireless communications are described. A base station may transmit, to a user equipment (UE), a bandwidth size indication that indicates a respective bandwidth size configured for each operating configuration of a set of operating configurations supported at the UE. The UE may transmit, to the base station, a priority indication for at least one operating configuration of the set of operating configurations based on the bandwidth size indication. The priority indication may correspond to a bandwidth size of the at least one operating criterion satisfying one or more criteria for data traffic. The base station may transmit, to the UE, a configuration indication that indicates to communicate according to a first operating configuration of the set of operating configurations based on the priority indication. The UE may communicate the data traffic with the base station based on the first operating configuration.

30 Claims, 17 Drawing Sheets

(51) Int. Cl.
    *H04W 72/23*     (2023.01)
    *H04W 72/56*     (2023.01)

(56) References Cited

U.S. PATENT DOCUMENTS

| | | | |
|---|---|---|---|
| 10,660,095 B1* | 5/2020 | Marupaduga | H04W 72/20 |
| 2002/0131393 A1* | 9/2002 | Baldridge | H04W 74/0875 370/412 |
| 2005/0094640 A1* | 5/2005 | Howe | H04L 47/2416 370/474 |
| 2010/0034178 A1* | 2/2010 | Bhar | H04W 28/16 370/338 |
| 2015/0148038 A1* | 5/2015 | Griot | H04W 76/15 455/435.2 |
| 2015/0172961 A1 | 6/2015 | Melin et al. | |
| 2016/0338107 A1 | 11/2016 | Zeng et al. | |
| 2017/0126571 A1* | 5/2017 | Yun | H04L 47/826 |
| 2018/0035488 A1 | 2/2018 | Yang et al. | |
| 2018/0332620 A1* | 11/2018 | Malladi | H04W 72/20 |
| 2019/0082350 A1* | 3/2019 | Kim | H04W 68/02 |
| 2019/0150042 A1* | 5/2019 | Srivastava | H04W 48/16 455/436 |
| 2019/0296789 A1* | 9/2019 | Yu | H04B 1/401 |
| 2019/0380128 A1* | 12/2019 | Park | H04W 72/21 |
| 2020/0145175 A1 | 5/2020 | Hassan Hussein et al. | |
| 2020/0170022 A1* | 5/2020 | Jones | H04W 72/0446 |
| 2020/0351738 A1* | 11/2020 | Huang | H04W 36/06 |
| 2021/0013997 A1* | 1/2021 | Liu | H04L 1/0052 |
| 2021/0051649 A1* | 2/2021 | He | H04W 72/044 |
| 2021/0211887 A1 | 7/2021 | Jones | |
| 2021/0352555 A1* | 11/2021 | Fujishiro | H04W 48/00 |
| 2021/0410107 A1 | 12/2021 | Park et al. | |
| 2022/0070878 A1* | 3/2022 | Lee | H04L 5/0078 |

* cited by examiner

INDICATION OF OPERATING CONFIGURATION PRIORITIES

The present application for patent claims the benefit of U.S. Provisional Patent Application No. 63/045,004 by YANG et al., entitled "INDICATION OF OPERATING CONFIGURATION PRIORITIES," filed Jun. 26, 2020, assigned to the assignee hereof, and expressly incorporated by reference herein.

FIELD OF TECHNOLOGY

The following relates generally to wireless communications and more specifically to indication of operating configuration priorities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with a base station using frequency division duplexing (FDD), time division duplexing (TDD), FDD TDD carrier aggregation (F+T CA), or non-standalone (NSA) communications. The base station may indicate, to the UE, whether to use FDD, TDD, F+T CA, or NSA. Current methods for determining whether to use FDD, TDD, F+T CA, or NSA may be deficient.

SUMMARY

The described techniques relate to improved methods, systems, devices, and apparatuses that support an indication of operating configuration priorities. Generally, the described techniques provide for a base station to select an operating configuration for communicating with a user equipment (UE) according to one or more preferred operating configuration indicated by the UE. For instance, a base station may transmit, to a UE, a bandwidth size indication that indicates a respective bandwidth size configured for each operating configuration of a set of operating configurations supported at the UE. The UE may transmit, to the base station, a priority indication for at least one operating configuration of the set of operating configurations based on the bandwidth size indication. The priority indication may correspond to a bandwidth size of the at least one operating criterion satisfying a service latency criterion, a throughput criterion, or both, for data traffic. The base station may transmit, to the UE, a configuration indication that indicates to communicate according to a first operating configuration of the set of operating configurations based on the priority indication for the at least one operating configuration. The UE may communicate the data traffic with the base station based on the first operating configuration.

A method for wireless communication at a UE is described. The method may include receiving, from a base station, a bandwidth size indication that indicates a respective bandwidth size configured for each operating configuration of a set of operating configurations supported at the UE, transmitting, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, receiving, from the base station, a configuration indication that indicates to communicate according to a first operating configuration of the set of operating configurations based on the priority indication for the at least one operating configuration, and communicating the data traffic with the base station based on the first operating configuration.

An apparatus for wireless communication at a UE is described. The apparatus may include a processor, memory in electronic communication with the processor, and instructions stored in the memory. The instructions may be executable by the processor to cause the apparatus to receive, from a base station, a bandwidth size indication that indicates a respective bandwidth size configured for each operating configuration of a set of operating configurations supported at the UE, transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, receive, from the base station, a configuration indication that indicates to communicate according to a first operating configuration of the set of operating configurations based on the priority indication for the at least one operating configuration, and communicate the data traffic with the base station based on the first operating configuration.

Another apparatus for wireless communication at a UE is described. The apparatus may include means for receiving, from a base station, a bandwidth size indication that indicates a respective bandwidth size configured for each operating configuration of a set of operating configurations supported at the UE, means for transmitting, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, means for receiving, from the base station, a configuration indication that indicates to communicate according to a first operating configuration of the set of operating configurations based on the priority indication for the at least one operating configuration, and means for communicating the data traffic with the base station based on the first operating configuration.

A non-transitory computer-readable medium storing code for wireless communication at a UE is described. The code may include instructions executable by a processor to receive, from a base station, a bandwidth size indication that indicates a respective bandwidth size configured for each operating configuration of a set of operating configurations supported at the UE, transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, receive, from the base station, a configuration indication that indicates to communicate according to a first operating configuration of the set of operating configurations based on the priority indication for the at least one operating configuration, and communicate the data traffic with the base station based on the first operating configuration.

In some examples of the method, apparatuses, and non-transitory computer-readable medium described herein, transmitting the priority indication may include operations, features, means, or instructions for transmitting the priority indication that indicates a relative priority among each operating configuration of the set of operating configurations.

In some examples of the method, apparatuses, and non-transitory computer-readable medium described herein, transmitting the priority indication may include operations, features, means, or instructions for transmitting the priority indication that indicates a first priority for the first operating configuration when the UE may be in a connected mode, a second priority for the first operating configuration when the UE may be in an idle mode or an inactive mode, or both.

In some examples of the method, apparatuses, and non-transitory computer-readable medium described herein, transmitting the priority indication may include operations, features, means, or instructions for transmitting the priority indication that indicates a first relative priority among each operating configuration of the set of operating configurations when the UE may be in a connected mode, a second relative priority among each operating configuration of the set of operating configurations when the UE may be in an idle mode or an inactive mode, or both.

In some examples of the method, apparatuses, and non-transitory computer-readable medium described herein, transmitting the priority indication may include operations, features, means, or instructions for transmitting a radio resource control (RRC) setup request message, an RRC resume request message, or a measurement report that includes the priority indication.

In some examples of the method, apparatuses, and non-transitory computer-readable medium described herein, receiving the configuration indication may include operations, features, means, or instructions for receiving an RRC setup message, an RRC resume message, or an RRC reconfiguration message that includes the configuration indication.

In some examples of the method, apparatuses, and non-transitory computer-readable medium described herein, transmitting the priority indication may include operations, features, means, or instructions for transmitting RRC signaling including the priority indication.

In some examples of the method, apparatuses, and non-transitory computer-readable medium described herein, receiving the configuration indication may include operations, features, means, or instructions for receiving the configuration indication that indicates to communicate according to the first operating configuration that may be the at least one operating configuration, where the first operating configuration may have a highest priority among each operating configuration of the set of operating configurations.

In some examples of the method, apparatuses, and non-transitory computer-readable medium described herein, the at least one operating configuration may include two or more operating configurations, and receiving the configuration indication may include operations, features, means, or instructions for receiving the configuration indication that indicates to communicate according to the first operating configuration that may be one of the two or more operating configurations, and where a second operating configuration of the two or more operating configurations may have a higher priority than the first operating configuration.

In some examples of the method, apparatuses, and non-transitory computer-readable medium described herein, the UE transmits the priority indication when in a connected mode.

Some examples of the method, apparatuses, and non-transitory computer-readable medium described herein may further include operations, features, means, or instructions for switching from the connected mode to an idle mode or an inactive mode, identifying one or more frequencies, one or more cells, or both based on the switching, and selecting one of the one or more frequencies, one of the one or more cells, or both based on priority information associated with the priority indication.

In some examples of the method, apparatuses, and non-transitory computer-readable medium described herein, the one of the one or more cells may include a cell associated with a second base station, the one of the one or more frequencies may include a frequency associated with the second base station, or both, and the method, apparatuses, and non-transitory computer-readable medium may include operations, features, means, or instructions for initiating communications with the second base station based on selecting the cell associated with the second base station, the frequency associated with the second base station, or both.

In some examples of the method, apparatuses, and non-transitory computer-readable medium described herein, the one of the one or more cells may include a cell associated with the base station, the one of the one or more frequencies may include a frequency associated with the base station, or both, and the method, apparatuses, and non-transitory computer-readable medium may include operations, features, means, or instructions for maintaining a connection with the base station based on selecting the cell associated with the base station, the frequency associated with the base station, or both.

In some examples of the method, apparatuses, and non-transitory computer-readable medium described herein, the at least one operating configuration includes a standalone (SA) FDD mode, an SA TDD mode, an FDD and TDD carrier aggregation mode, a non-standalone (NSA) mode, a shared resource mode in which one or both of a time resource or a frequency resource may be shared by multiple radio access technologies (RATs), or any combination thereof.

In some examples of the method, apparatuses, and non-transitory computer-readable medium described herein, receiving the bandwidth size indication may include operations, features, means, or instructions for receiving, from the base station, the bandwidth size indication that indicates a set of multiple bandwidth sizes configured for each operating configuration of the set of multiple operating configurations supported at the UE.

In some examples of the method, apparatuses, and non-transitory computer-readable medium described herein, transmitting the priority indication may include operations, features, means, or instructions for transmitting, to the base station, the priority indication for the at least one operating configuration corresponding to a bandwidth size of the at least one operating configuration satisfying a power consumption criterion, an overheating criterion, or both.

In some examples of the method, apparatuses, and non-transitory computer-readable medium described herein, transmitting the priority indication may include operations, features, means, or instructions for transmitting the priority indication that indicates a higher priority for a first operation configuration of the set of multiple operating configurations that may have a first bandwidth part (BWP) including a synchronization signal block (SSB) than a second operation configuration of the set of multiple operating configurations that may have a second BWP without an SSB.

A method for wireless communication at a base station is described. The method may include transmitting, to a UE, a bandwidth size indication that indicates a respective bandwidth size configured for each operating configuration of a set of operating configurations, receiving, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, transmitting, to the UE, a configuration indication that indicates to communicate according to a first operating configuration of the set of operating configurations based on the priority indication for the at least one operating configuration, and communicating the data traffic with the UE based on the first operating configuration.

An apparatus for wireless communication at a base station is described. The apparatus may include a processor, memory in electronic communication with the processor, and instructions stored in the memory. The instructions may be executable by the processor to cause the apparatus to transmit, to a UE, a bandwidth size indication that indicates a respective bandwidth size configured for each operating configuration of a set of operating configurations, receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, transmit, to the UE, a configuration indication that indicates to communicate according to a first operating configuration of the set of operating configurations based on the priority indication for the at least one operating configuration, and communicate the data traffic with the UE based on the first operating configuration.

Another apparatus for wireless communication at a base station is described. The apparatus may include means for transmitting, to a UE, a bandwidth size indication that indicates a respective bandwidth size configured for each operating configuration of a set of operating configurations, means for receiving, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, means for transmitting, to the UE, a configuration indication that indicates to communicate according to a first operating configuration of the set of operating configurations based on the priority indication for the at least one operating configuration, and means for communicating the data traffic with the UE based on the first operating configuration.

A non-transitory computer-readable medium storing code for wireless communication at a base station is described. The code may include instructions executable by a processor to transmit, to a UE, a bandwidth size indication that indicates a respective bandwidth size configured for each operating configuration of a set of operating configurations, receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, transmit, to the UE, a configuration indication that indicates to communicate according to a first operating configuration of the set of operating configurations based on the priority indication for the at least one operating configuration, and communicate the data traffic with the UE based on the first operating configuration.

In some examples of the method, apparatuses, and non-transitory computer-readable medium described herein, receiving the priority indication may include operations, features, means, or instructions for receiving the priority indication that indicates a relative priority among each operating configuration of the set of operating configurations.

In some examples of the method, apparatuses, and non-transitory computer-readable medium described herein, receiving the priority indication may include operations, features, means, or instructions for receiving the priority indication that indicates a first priority for the first operating configuration when the UE may be in a connected mode, a second priority for the first operating configuration when the UE may be in an idle mode or an inactive mode, or both.

In some examples of the method, apparatuses, and non-transitory computer-readable medium described herein, receiving the priority indication may include operations, features, means, or instructions for receiving the priority indication that indicates a first relative priority among each operating configuration of the set of operating configurations when the UE may be in a connected mode, a second relative priority among each operating configuration of the set of operating configurations when the UE may be in an idle mode or an inactive mode, or both.

In some examples of the method, apparatuses, and non-transitory computer-readable medium described herein, receiving the priority indication may include operations, features, means, or instructions for receiving an RRC setup request message, an RRC resume request message, or a measurement report that includes the priority indication.

In some examples of the method, apparatuses, and non-transitory computer-readable medium described herein, transmitting the configuration indication may include operations, features, means, or instructions for transmitting an RRC setup message, an RRC resume message, or an RRC reconfiguration message that includes the configuration indication.

In some examples of the method, apparatuses, and non-transitory computer-readable medium described herein, receiving the priority indication may include operations, features, means, or instructions for receiving RRC signaling including the priority indication.

In some examples of the method, apparatuses, and non-transitory computer-readable medium described herein, transmitting the configuration indication may include operations, features, means, or instructions for transmitting the configuration indication that indicates to communicate according to the first operating configuration that may be the at least one operating configuration, where the first operating configuration may have a highest priority among each operating configuration of the set of operating configurations.

In some examples of the method, apparatuses, and non-transitory computer-readable medium described herein, the at least one operating configuration may include two or more operating configurations, and transmitting the configuration indication may include operations, features, means, or instructions for transmitting the configuration indication that indicates to communicate according to the first operating configuration that may be one of the two or more operating configurations, and where a second operating configuration of the two or more operating configurations may have a higher priority than the first operating configuration.

Some examples of the method, apparatuses, and non-transitory computer-readable medium described herein may further include operations, features, means, or instructions for determining that the second operating configuration may be unsupported at the base station, and transmitting the configuration indication that indicates to communicate according to the first operating configuration based on determining that the second operating configuration may be unsupported at the base station.

In some examples of the method, apparatuses, and non-transitory computer-readable medium described herein, the at least one operating configuration includes an SA FDD mode, an SA TDD mode, an FDD and TDD carrier aggregation mode, an NSA mode, a shared resource mode in which one or both of a time resource or a frequency resource may be shared by multiple RATs, or any combination thereof.

In some examples of the method, apparatuses, and non-transitory computer-readable medium described herein, transmitting the bandwidth size indication may include operations, features, means, or instructions for transmitting, to the UE, the bandwidth size indication that indicates a set of multiple bandwidth sizes configured for each operating configuration of the set of multiple operating configurations supported at the UE.

In some examples of the method, apparatuses, and non-transitory computer-readable medium described herein, receiving the priority indication may include operations, features, means, or instructions for transmitting, from the UE, the priority indication for the at least one operating configuration corresponding to a bandwidth size of the at least one operating configuration satisfying a power consumption criterion, an overheating criterion, or both.

In some examples of the method, apparatuses, and non-transitory computer-readable medium described herein, receiving the priority indication may include operations, features, means, or instructions for receiving the priority indication that indicates a higher priority for a first operation configuration of the set of multiple operating configurations that may have a first BWP including an SSB than a second operation configuration of the set of multiple operating configurations that may have a second BWP without an SSB.

DETAILED DESCRIPTION

Figure 1:
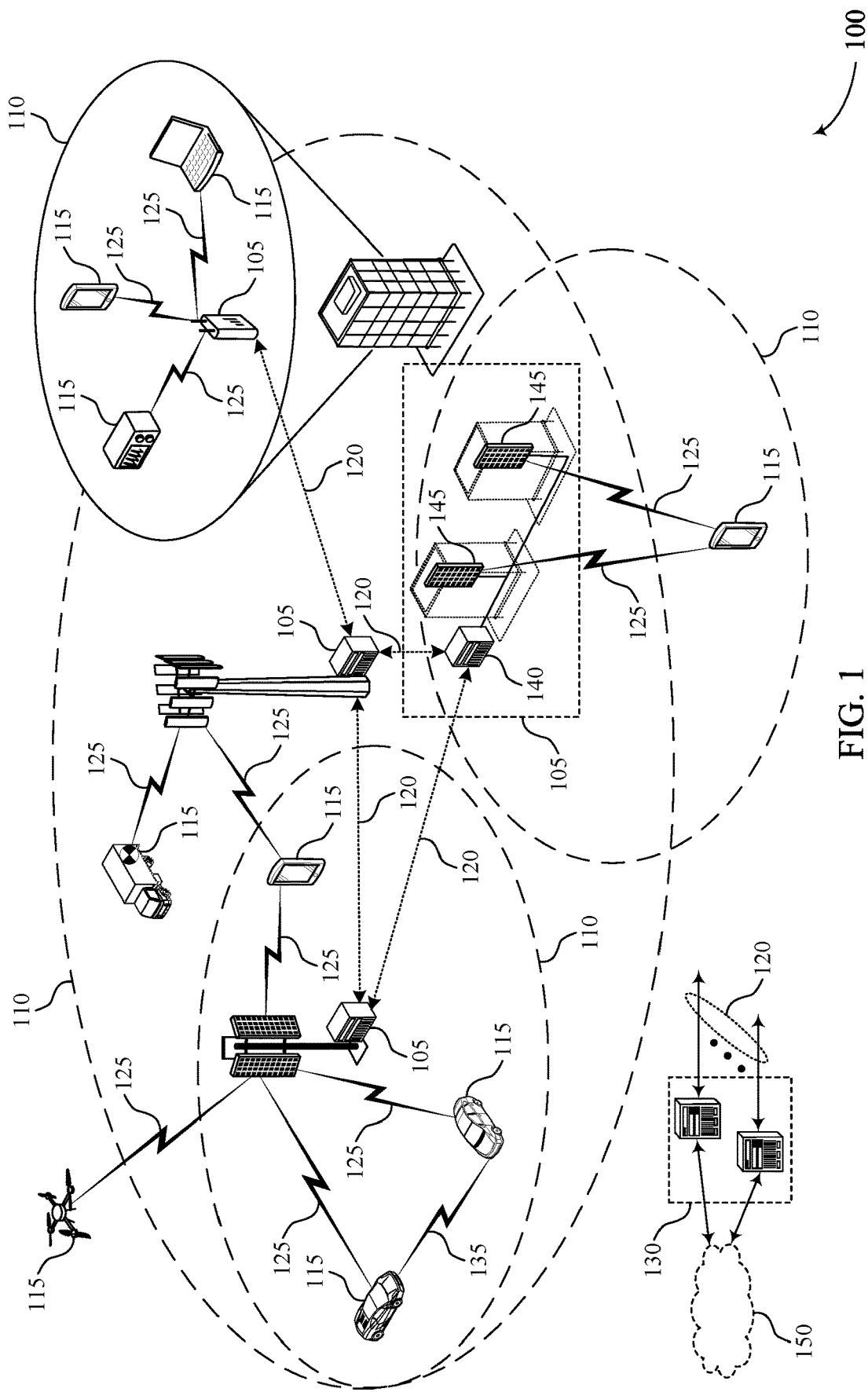
FIG. 1 illustrates an example of a system for wireless communications that supports an indication of operating configuration priorities in accordance with aspects of the present disclosure.

A user equipment (UE) may be capable of communicating with a base station using different radio access technologies (RATs), such as New Radio (NR) and Long Term Evolution (LTE), and different operating configurations, such as frequency division duplexing (FDD), time division duplexing (TDD), FDD and TDD carrier aggregation (F+T CA), or non-standalone (NSA) communications. Each operating configuration may be associated with a different amount of bandwidth for one or more RATs. For instance, a first bandwidth may be available for NR communications and a second bandwidth may be available for LTE communications.

In some examples, the amount of bandwidth associated with a RAT for a particular operating configuration may change or may vary from base station to base station. For instance, a first base station may use a first bandwidth with a first bandwidth size (e.g., 20 MHz) for performing NR FDD communications and a second base station may use a second bandwidth with a second bandwidth size (e.g., 50 MHz) for performing NR FDD communications (e.g., a bandwidth of 50 MHz), where the first bandwidth size is different than the second bandwidth size. When the amount of available bandwidth for an operating configuration changes or varies from base station to base station, power consumption at the UE and associated with communications in that operating configuration may change or vary as well.

It may be advantageous for a UE to use an operating configuration in which the UE has lowest power consumption, as the UE may conserve more power. However, if the power consumption varies with bandwidth, an operating configuration associated with the lowest power consumption when communicating with a first base station may be different than an operating configuration associated with the lowest power consumption when communicating with a second base station. As such, techniques which enable a UE to use an operating configuration with the lowest power consumption while accounting for changes or variance in bandwidth may be advantageous.

To enable a UE to account for changes or variance in bandwidth, the UE may determine a priority for each operating configuration supported at the UE based on bandwidth sizes for each operating configuration. For instance, the UE may give higher priority to operating configurations with larger bandwidths that satisfy a data throughput condition s, a service latency condition, or both. The UE may transmit an indication of this priority to a base station (e.g., the base station that indicated the bandwidth sizes). Using the indicated priority for each operating configuration, the base station may select an operating configuration among the operating configurations supported at the UE that is also supported at the base station. The base station may indicate the selected operating configuration to the UE, and the UE and the base station may communicate according to the selected operating configuration.

Aspects of the disclosure are initially described in the context of wireless communications systems. Additional aspects of the disclosure are described in the context of communication band schemes, an operating band setup procedure, and a process flow. Aspects of the disclosure are further illustrated by and described with reference to apparatus diagrams, system diagrams, and flowcharts that relate to indication of operating configuration priorities.

FIG. 1 illustrates an example of a wireless communications system 100 that supports an indication of operating configuration priorities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone (SA) mode where initial acquisition and connection may be conducted by the UEs 115 via the carrier, or the carrier may be operated in an NSA mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

A UE 115 may operate in a connected mode (e.g., RRC_CONNECTED) or an idle mode (e.g., RRC_IDLE) or an inactive mode. When operating in the connected mode, the UE 115 may communicate data with a base station. When operating in the idle or inactive mode, the UE 115 may not communicate data with a base station.

Generally, the described techniques provide for a base station 105 to select an operating configuration for communicating with a UE 115 according to one or more preferred operating configurations indicated by the UE 115. For instance, a base station 105 may transmit, to a UE 115, a bandwidth size indication that indicates a respective bandwidth size configured for each operating configuration of a set of operating configurations supported at the UE 115. The UE 115 may transmit, to the base station 105, a priority indication for at least one operating configuration of the set of operating configurations based on the bandwidth size indication. The priority indication may correspond to a bandwidth size of the at least one operating criterion satisfying a service latency criterion, a throughput criterion, or both, for data traffic. The base station 105 may transmit, to the UE 115, a configuration indication that indicates to communicate according to a first operating configuration of the set of operating configurations based on the priority indication for the at least one operating configuration. The UE 115 may communicate the data traffic with the base station 105 based on the first operating configuration.

Figure 2A:
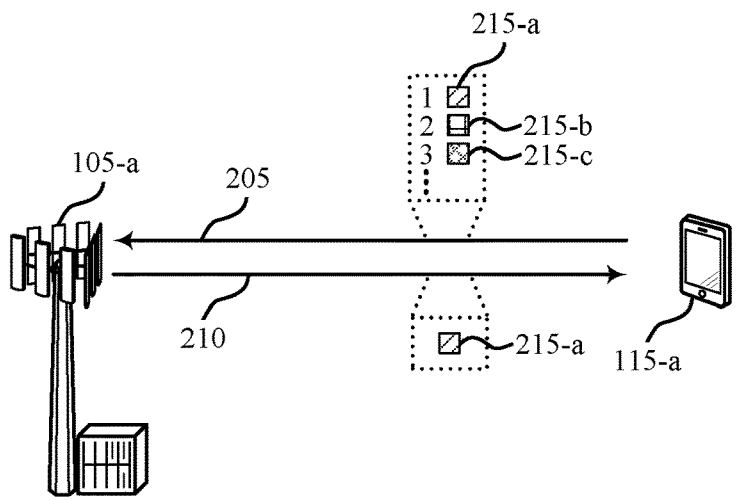
FIGS. 2A and 2B illustrate examples of wireless communications systems that support an indication of operating configuration priorities in accordance with aspects of the present disclosure.

FIG. 2A illustrates an example of a wireless communications system 200-a that supports an indication of operating configuration priorities in accordance with aspects of the present disclosure. In some examples, wireless communications system 200-a may implement aspects of wireless communications system 100. For instance, UE 115-a may be an example of aspects of a UE 115 as described with reference to FIG. 1 and base station 105-a may be an example of aspects of a base station 105 as described with reference to FIG. 1.

In some examples, base station 105-a may allocate a predefined amount of bandwidth (e.g., a bandwidth size) for each operating configuration 220 supported at UE 115-a and may indicate (e.g., via bandwidth size indication 205) the amounts of bandwidth to UE 115-a. A portion of bandwidth may include multiple BWPs, where each BWP may have a different bandwidth size (e.g., 5 MHz, 20 MHz, 50 MHz, 100 MHz). In an example, the network (e.g., base station 105-a) may configure up to four BWPs, where each BWP may be configured with a different bandwidth size (e.g., in terms of bandwidth length, subcarrier spacing, and the like). Additionally or alternatively, when UE 115-a is in a connected mode (e.g., RRC_CONNECTED), base station 105-a may configure UE 115-a (e.g., via configuration indication 215) with which operating configuration 220 to use to communicate with base station 105-a. In the techniques described herein, UE 115-a may assist base station 105-a in determining which operating configuration 220 to use according to the allocated amount of bandwidth for each operating configuration 220 and one or more of the type of traffic UE 115-a is to communicate, a service latency criterion, or a throughput criterion. For instance, UE 115-a may use the allocated bandwidth size for each operating configuration 220 to prioritize operating conditions in which data traffic from UE 115-a may meet latency conditions (e.g., constraints), throughput conditions (e.g., constraints), or both. UE 115-a may assist base station 105-a in determining which operating configuration 220 to use according to the allocated amount of bandwidth for each operating configuration 220 and one or more of a power consumption criterion, an overheating criterion, or both. UE 115-a may transmit a priority indication (e.g., priority indication 210) that indicates a single operating configuration 220 with the highest priority (e.g., a highest preference) or may include a list defining a priority order (e.g., a preference order) for the operating configurations 220. UE 115-a may transmit a priority indication (e.g., priority indication 210) that indicates a higher priority for a first operating configuration 220 of the operating configurations 220 that has a first BWP including a synchronization signal block (SSB) than a priority of a second operation configuration 220 of the operating configurations 220 that has a second BWP without an SSB. Base station 105-a may use the operating configuration 220 with the highest preference that is also supported at base station 105-*a* when configuring UE 115-*a* with an operating configuration 220.

Base station 105-*a* may transmit, to UE 115-*a*, a bandwidth size indication 205 that indicates a respective bandwidth size available for each operating configuration 220 of a set of operating configurations 220 supported at the UE 115-*a*. In some cases, the bandwidth size indication 205 may indicate multiple bandwidth sizes configured for each operating configuration 220 of the set of operating configurations 220 supported at the UE 115-*a*.

The set of operating configurations 220 may include one or more of SA FDD, SA TDD, FDD TDD carrier aggregation (F+T CA), an NSA mode, or a shared resource mode in which one or both of a time resource or a frequency resource are shared by multiple RATs.

In some examples, UE 115-*a* may provide assistance information, which may include a priority indication 210, via radio resource control (RRC) signaling during call setup, call resume, handover, or during an on-going call for a network (e.g., a base station 105-*a*) to enable base station 105-*a* to select an operating configuration 220 (e.g., FDD, TDD, or F+T CA). For instance, UE 115-*a* may transmit, to base station 105-*a*, a priority indication 210 for at least one operating configuration 220. UE 115-*a* may transmit the priority indication 210 based on the bandwidth size indication 205. For instance, the priority order may depend at least partially on the bandwidth size of each operating configuration 220 as described herein and, thus, the priority indication may be based on the operating configuration 220. The priority indication 210 may correspond to a bandwidth size of the at least one operating configuration 220 satisfying a service latency criterion (e.g., a service latency constraint), a throughput criterion (e.g., a throughput constraint), or both for data traffic. The priority indication 210 may correspond to a bandwidth size of the at least one operating configuration 220 satisfying a power consumption criterion (e.g., a power consumption constraint), an overheating criterion (e.g., an overheating constraint), or both. The priority indication 210 may be included in RRC signaling, which may include an RRC setup request message, an RRC resume request message, or a measurement report (MR). UE 115-*a* may transmit the priority indication 210 when in a connected mode (e.g., RRC_CONNECTED).

In some examples, the priority indication 210 may indicate a relative priority among each operating configuration of the set of operating configurations. For instance, if operating configuration 220-*a* has a highest priority, operating configuration 220-*b* has a second highest priority, and operating configuration 220-*c* has a lowest priority, the priority indication 210 may indicate that operating configuration 220-*a* has the highest priority, operating configuration 220-*b* has the second highest priority, and operating configuration 220-*c* has the lowest priority. Additionally or alternatively, the priority indication 210 may indicate a first priority for an operating configuration 220 when UE 115-*a* is in a connected mode (e.g., RRC_CONNECTED), a second priority for the operating configuration 220 when UE 115-*a* is in the idle or inactive mode (e.g., RRC_IDLE), or both. In some examples, the priority indication may indicate a first relative priority among each operating configuration 220 (e.g., operating configurations 220-*a*, 220-*b*, and 220-*c*) when UE 115-*a* is in a connected mode, a second relative priority among each operating configuration 220 when UE 115-*a* is in an idle mode, or both.

The network (e.g., base station 105-*a*) may select or switch operating configurations 220 (e.g., SA FDD, TDD, F+T CA, or NSA) based on UE preferred information, which may refer to or include assistance information, the priority information 210, or both as described herein. For instance, base station 105-*a* may transmit, to UE 115-*a*, a configuration indication 215 that indicates to communicate according to a first operating configuration 220 (e.g., operating configuration 220-*a*) based on the priority indication 210 for the at least one operating configuration. The configuration indication may be included in an RRC setup message, an RRC resume message, or an RRC reconfiguration message. In some examples, the network (e.g., base station 105-*a*) may select or switch operating configuration 220 (e.g., SA FDD, TDD, F+T CA, or NSA) based on UE preferred information, a network buffer size, a latency (e.g., a service latency), or a combination thereof.

In some examples, the configuration indication 215 may indicate an operating configuration 220 with the highest priority among each operating configuration 220 of the set of operating configurations 220 supported at UE 115-*a*. For instance, if operating configuration 220-*a* is indicated by UE 115-*a* (e.g., via priority indication 210) to have the highest priority, base station 105-*a* may select to communicate with UE 115-*a* via operating configuration 220-*a* and may indicate operating configuration 220-*a* in configuration indication 215. Alternatively or additionally, the configuration indication 215 may indicate an operating configuration with lower than the highest priority among each operating configuration 220 of the set of operating configurations 220 supported at UE 115-*a*. For instance, if operating configuration 220-*a* is indicated by UE 115-*a* (e.g., via priority indication 210) to have the highest priority and operating configuration 220-*b* is indicated by UE 115-*a* (e.g., via the same priority indication 210 or a different one) to have a lower priority than operating configuration 220-*a*, base station 105-*a*, in some examples, may select to communicate with UE 115-*a* via operating configuration 220-*b* and may indicate operating configuration 220-*b* in the configuration indication 215. Base station 105-*a* may select the lower priority operating configuration 220, for instance, based on base station 105-*a* determining that the highest priority operating configuration 220 (e.g., operating configuration 220-*a*) is unsupported at base station 105-*a*.

After receiving the configuration indication 215, UE 115-*a* and base station 105-*a* may communicate the data traffic based on the selected operating configuration 220 (e.g., operating configuration 220-*a*). Communicating may involve UE 115-*a* transmitting data traffic to base station 105-*a* (e.g., via a physical uplink shared channel (PUSCH)) or may involve base station 105-*a* transmitting data traffic to UE 115-*a* (e.g., via a physical downlink shared channel (PDSCH)).

The network (base station 105-*a*) may adjust idle or inactive and connected mode priorities for the operating configurations 220 (e.g., SA FDD, TDD, F+T CA, NSA, or a shared resource mode in which one or both of a time resource or a frequency resource are shared by multiple RATs) based on the UE preferred information. For example, if base station 105-*a* initially stores a first relative priority for a first set of operating configurations 220 when UE 115-*a* is in a connected mode and a second relative priority for a second set of operating configurations 220 when UE 115-*a* is in an idle or inactive mode, base station 105-*a* may update the first relative priority and second relative priority after receiving a priority indication 210 (e.g., the priority indication 210 may indicate an updated first relative priority and an updated second relative priority).

Figure 2B:
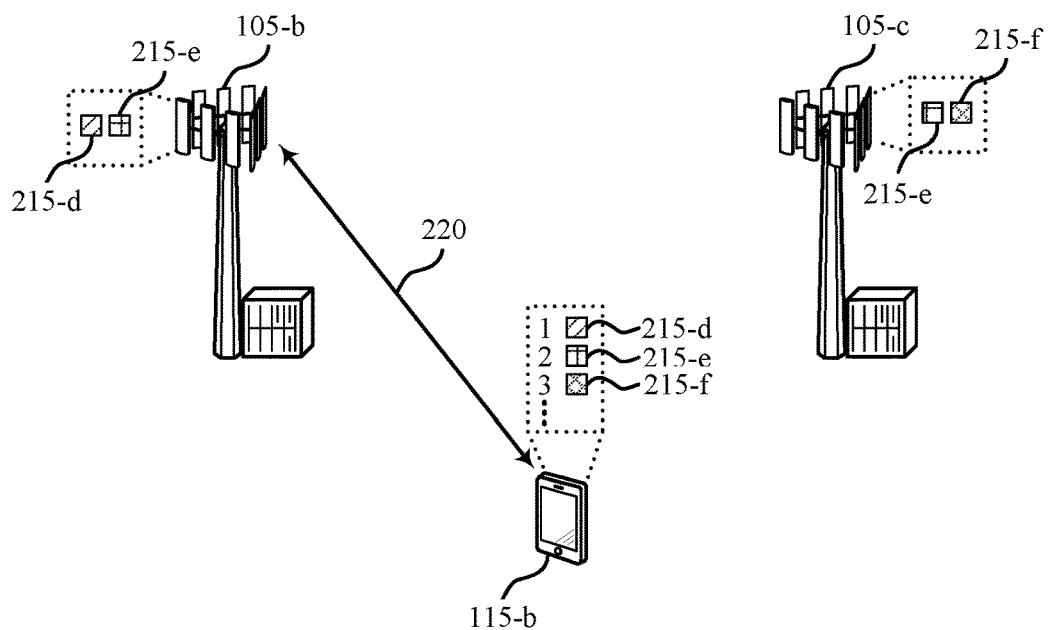

FIG. 2B illustrates an example of a wireless communications system 200-*b* that supports an indication of operating configuration priorities in accordance with aspects of the present disclosure. In some examples, wireless communications system 200-*b* may implement aspects of wireless communications system 100. For instance, UE 115-*b* may be an example of aspects of a UE 115 as described with reference to FIG. 1 and base stations 105-*b* and 105-*c* may be examples of aspects of base stations 105 as described with reference to FIG. 1.

In some examples, UE 115-*b* may perform cell selection or reselection, in which UE 115-*b* selects a cell to camp on. UE 115-*b* may perform cell selection or reselection after power up, when UE 115-*b* is recovering from being out of service, or when UE 115-*b* is in an idle mode (e.g., RRC_IDLE) or an inactive mode.

UE 115-*b* may select a cell to camp on based on the priority of operating configurations 220. For instance, UE 115-*b* may give an operating configuration 220 (e.g., SA FDD, SA TDD, LTE) high or low cell selection or reselection priority based on a service latency (e.g., a service latency criterion), a throughput constraint (e.g., a throughput criterion), battery and power saving (e.g., an amount of power or energy saved by UE 115-*b*), overheating (e.g., an overheating constraint), or any combination thereof. In some examples, UE 115-*b* may determine that UE 115-*b* supports operating configurations 220-*d*, 220-*e*, and 220-*f*, where UE 115-*b* may determine that operating configuration 220-*d* has a highest priority, operating configuration 220-*e* has a second highest priority, and operating configuration 220-*f* has a lowest priority according to the methods described herein. Additionally, UE 115-*b* may determine that base station 105-*b* supports operating configurations 220-*d* and 220-*e* and that base station 105-*c* supports operating configurations 220-*e* and 220-*f*. Due to base station 105-*b* supporting the highest priority operating configuration 220-*d*, base station 105-*c*, or both not supporting the highest priority operating configuration 220-*d*, UE 115-*b* may determine to camp on base station 105-*b*.

In some examples, UE 115-*b* may initially communicate with a base station 105 in a connected mode and may transmit a priority indication 210 to the base station 105. UE 115-*b* may switch from a connected mode (e.g., RRC_CONNECTED) to an idle mode (e.g., RRC_IDLE) or inactive mode. When UE 115-*b* is in a connected mode, UE 115-*b* may lack autonomy in communication decisions, such as cell selection or cell reselection. Instead, UE 115-*b* may coordinate with base station 105-*a* when performing communication decisions, such as cell selection or reselection. However, in an idle or inactive mode, UE 115-*b* may have autonomy to search for a cell having sufficient bandwidth available for an operating configuration 220. For instance, UE 115-*b* may identify one or more cells, one or more frequencies, or both based on the switching and may select one of the one or more cells, one of the one or more frequencies, or both based on priority information associated with the priority indication 210. If the selected one cell is a cell associated with a second base station 105, the selected frequency is a frequency associated with a second base station 105, or both, UE 115-*b* may initiate communications with the second base station 105. In some such cases, UE 115-*b* may cease communications with the base station 105 with which UE 115-*b* initially communicated. If the selected one cell is a cell associated with the base station 105 with which UE 115-*b* initially communicated, the selected one frequency is a frequency associated with the base station 105 with which UE 115-*b* initially communicated, or both, UE 115-*b* may maintain a connection with the base station 105.

The proposed methods may have one or more advantages. For instance, by performing the methods described herein, a UE 115 may meet service latency constraints, throughput constraints, or both with less battery consumption. For instance, the highest priority operating configuration 220 indicated in the priority indication 210 may be the operating configuration 220 with a lowest battery consumption that still meets service latency constraints, throughput constraints, or both (e.g., service latency criteria, throughput criteria, or both).

Figure 3A:
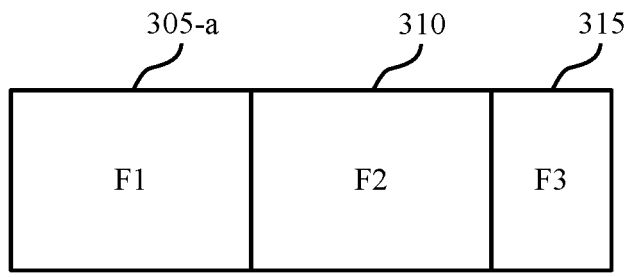
FIGS. 3A and 3B illustrate examples of communication band schemes that supports an indication of operating configuration priorities in accordance with aspects of the present disclosure.
Figure 3B:
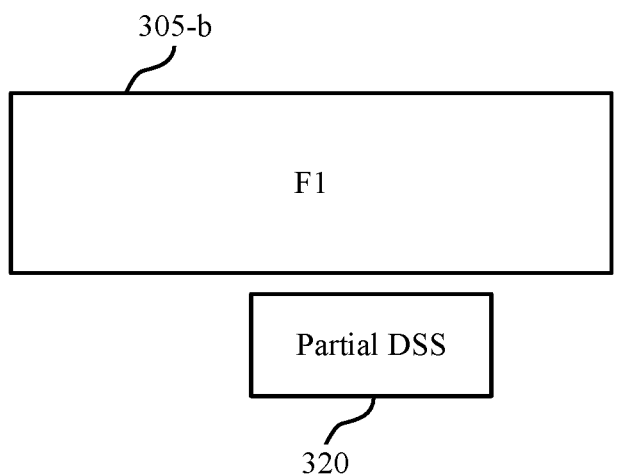

FIGS. 3A and 3B illustrate examples of communication band schemes 300-*a* and 300-*b* that support an indication of operating configuration priorities in accordance with aspects of the present disclosure. In some examples, communication band schemes 300-*a* and 300-*b* may be implemented by aspects of wireless communications system 100. For instance, communication band schemes 300-*a* and 300-*b* may represent configurations of an available spectrum when a UE 115 is operating in an SA FDD mode.

Communication band scheme 300-*a* includes bandwidth 305-*a*, which may be referred to as F1; bandwidth 310, which may be referred to as F2; and bandwidth 315, which may be referred to as F3. A UE 115 may use bandwidth 305-*a* to perform NR communications and may use bandwidths 310 and 315 to perform LTE communications. Bandwidths 305-*a*, 310, and 315 may be contiguous with each other. For instance, bandwidth 305-*a* may be contiguous with bandwidth 310 and bandwidth 310 may be contiguous with bandwidth 315. Bandwidth 305-*a* may span 20 MHz, bandwidth 310 may span 20 MHz, and bandwidth 315 may span 10 MHz. As such, bandwidths 305-*a*, 310, and 315 may span a total of 50 MHz.

Communication band scheme 300-*b* includes bandwidth 305-*b*, which may be referred to as F1 and partial dynamic spectrum sharing (DSS) band 320, which may be an example of an FDD channel. A UE 115 may use bandwidth 305-*b* to perform NR communications and may use DSS band 320 to perform LTE communications. Bandwidth 305-*b* may be formed by combining bandwidths 305-*a*, 310, and 315 and may be internally contiguous. As such, bandwidth 305-*b* may span 50 MHz. DSS band 320 may overlap a same set of frequencies as bandwidth 310 (e.g., the DSS band 320 may span 20 MHz and may line up with bandwidth 310). Additionally or alternatively, the DSS band 320 may at least partially overlap the frequencies of bandwidths 305-*a*, bandwidth 315, or both. A UE 115 that has a support capability for bandwidths with a maximum bandwidth of 20 MHz and for bandwidths greater than 20 MHz may be referred to as a mixed capability device. The maximum bandwidth support capability may depend on whether the UE 115 is operating in a CA mode or a non-CA mode. For instance, the UE 115 may support bandwidths greater than 20 MHz in a non-CA mode (e.g., a UE 115 may support communication band scheme 300-*b* in a non-CA mode), but may not support bandwidths greater than 20 MHz in a CA mode (e.g., a UE 115 may not support bandwidths greater than 20 MHz in a CA mode).

Different base stations 105 may support different amounts of bandwidth (e.g., different bandwidth sizes) for different operating configurations. For instance, a first base station 105 using communication band scheme 300-*a* may support 20 MHz for NR communications and a second base station 105 using communication band scheme 300-*b* may support 50 MHz for NR communications. As described herein, a UE 115 may prioritize operating configurations according to an amount of bandwidth available for each operating configuration. As such, the UE 115 may prioritize FDD among other operating configurations differently when a base station 105 uses communication band scheme 300-*a* as compared to when a base station 105 uses communication band scheme 300-*b*.

As described herein, a UE 115 performing NR communications in bandwidth 305-*b* may have a greater span of available spectrum for performing NR communications as compared to the UE 115 performing NR communications in bandwidth 305-*a*. When a UE has a greater amount of bandwidth for performing communications, the UE may transmit transmissions that satisfy a service latency criterion, a throughput criterion, an overheating criterion, or a combination thereof with less power consumption. Accordingly, the UE may consume less power when communicating in bandwidth 305-*b* as compared to communicating in bandwidth 305-*a*. As such, when determining a priority order for operating configurations, a UE 115 performing NR FDD communications with communication band scheme 300-*b* may give a higher priority to NR FDD relative to other operating configurations as compared to a UE 115 performing NR communications with communication band scheme 300-*a*.

Figure 4:
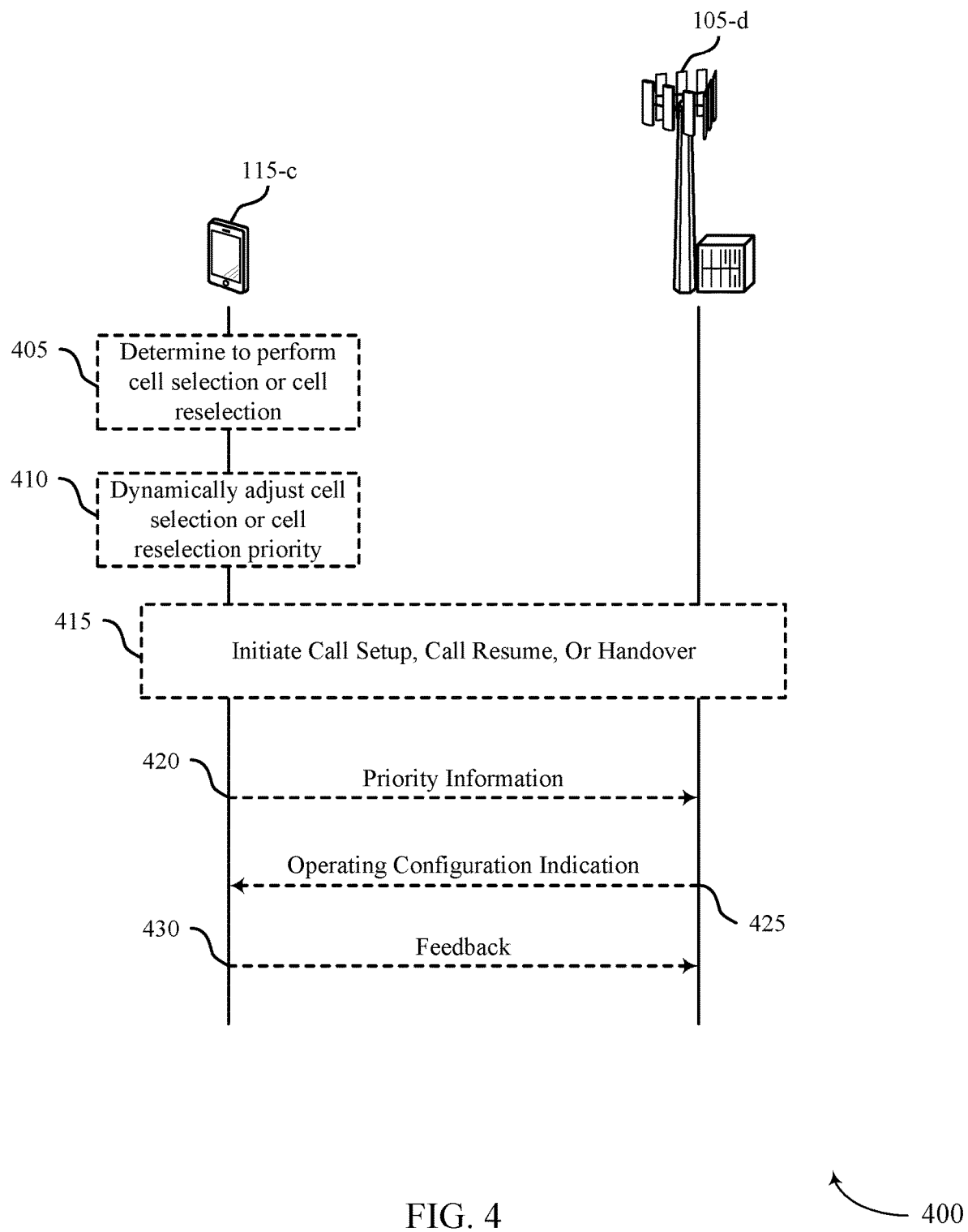
FIG. 4 illustrates an example of an operating configuration setup procedure that supports an indication of operating configuration priorities in accordance with aspects of the present disclosure.

FIG. 4 illustrates an example of an operating band setup procedure 400 that supports an indication of operating configuration priorities in accordance with aspects of the present disclosure. In some examples, operating band setup procedure 400 may be implemented by aspects of wireless communications system 100. For instance, UE 115-*c* may be an example of aspects of a UE 115 as described with reference to FIG. 1 and base station 105-*d* may be an example of aspects of a base station 105 as described with reference to FIG. 1.

At 405, UE 115-*c* may determine to perform cell selection or cell reselection. UE 115-*c* may determine to perform the cell selection or reselection at power on, when recovering from being out of service, or during idle mobility (e.g., when UE 115-*c* is in an idle mode).

At 410, UE 115-*c* may dynamically adjust cell selection or reselection priority for one or more operating configurations. For instance, UE 115-*c* may determine or update a priority order for the one or more operating configurations based on a bandwidth size for each of the one or more operating configurations. For instance, UE 115-*c* may give higher priority to operating configurations with larger bandwidths that satisfy throughput constraints, service latency constraints, power consumption constraints, overheating constraints, or a combination thereof. UE 115-*c* may select a cell to camp on that supports a highest priority operating configuration according to the determined or updated priority order. In some examples, UE 115-*c* may dynamically adjust the priority for SA FDD, SA TDD, and NSA LTE anchors.

At 415, UE 115-*c* may initiate a call setup procedure, a call resume procedure, or a handover procedure with base station 105-*d*. Initiating each procedure may involve UE 115-*c* transitioning to a connected mode (e.g., from an idle or inactive mode). Additionally or alternatively, initiating each procedure may involve UE 115-*c* and base station 105-*d* communicating one or more signals.

At 420, UE 115-*c* may transmit assistance information (e.g., a priority indication) to base station 105-*d*. UE 115-*c* may transmit an NR RRC setup request message, an NR RRC resume request message, or an MR that includes the priority indication. UE 115-*c* may transmit an NR RRC setup request message as part of a call setup procedure; may transmit an NR RRC resume request message as part of a call resume procedure; and may transmit an MR as part of handover.

At 425, base station 105-*d* may transmit a configuration indication. Base station 105-*d* may transmit an NR RRC setup message, an NR RRC resume message, or an RRC reconfiguration message (e.g., an RRC connection reconfiguration message) that includes the configuration indication. Base station 105-*d* may transmit an NR RRC setup message as part of a call setup procedure; an NR RRC resume message as part of a call resume procedure; and an RRC reconfiguration message as part of a handover procedure.

At 430, UE 115-*c* may transmit feedback to base station 105-*d*. The feedback may, for instance, include an NR RRC setup message or an RRC reconfiguration complete message. UE 115-*c* may transmit an NR RRC setup message part of a call setup procedure and may transmit an RRC reconfiguration complete message as part of a handover procedure.

Figure 5:
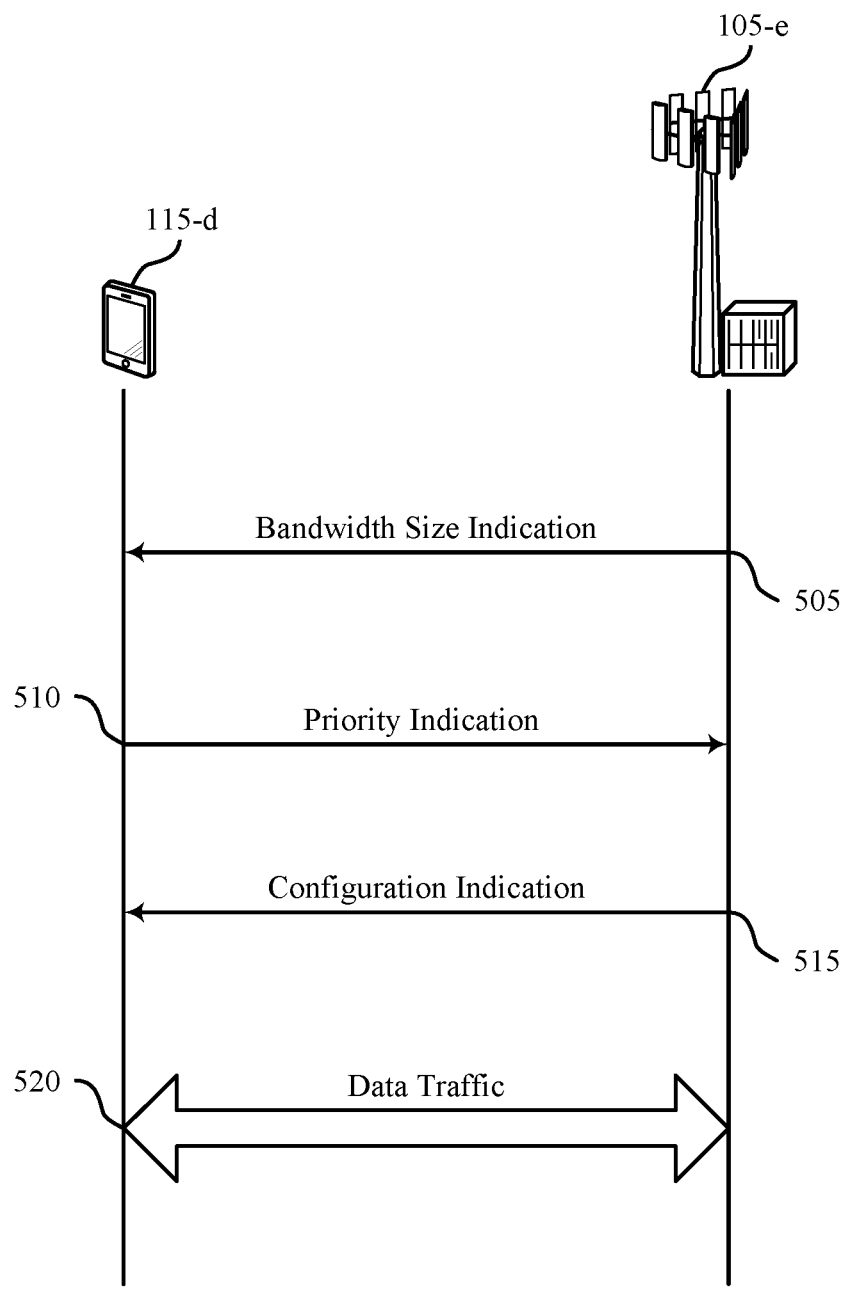
FIG. 5 illustrates an example of a process flow that supports an indication of operating configuration priorities in accordance with aspects of the present disclosure.

FIG. 5 illustrates an example of a process flow 500 that supports an indication of operating configuration priorities in accordance with aspects of the present disclosure. In some examples, process flow 500 may be implemented by aspects of wireless communications system 100. For instance, UE 115-*d* may be an example of aspects of a UE 115 as described with reference to FIG. 1 and base station 105-*e* may be an example of aspects of a base station 105 as described with reference to FIG. 1.

At 505, base station 105-*e* may transmit a bandwidth size indication that indicates a respective bandwidth size configured for each operating configuration of a set of operating configurations supported at UE 115-*d*. UE 115-*d* may receive the bandwidth size indication. In some cases, the bandwidth size indication may indicate multiple bandwidth sizes configured for each operating configuration of the set of operating configurations supported at UE 115-*d*.

At 510, UE 115-*d* may transmit a priority indication for at least one operating configuration of the set of operating configurations based on the bandwidth size indication. The priority indication may correspond to a bandwidth size of the at least one operating configuration satisfying a service latency criterion, a throughput criterion, or both, for data traffic. In some examples, UE 115-*d* may transmit the priority indication when UE 115-*d* is in a connected mode. As described herein, UE 115-*d* may provide the priority indication, which may also be referred to as a priority mode indication, based on bandwidths for each operating configuration supported at UE 115-*d*. The priority indication may assist base station 105-*e* with selecting an operating configuration that is suitable for UE 115-*d* (e.g., an operating configuration that meets a latency criterion at UE 115-*d*, a throughput criterion at UE 115-*d*, or both). Base station 105-*e* may receive the priority indication.

In some examples, the priority indication may indicate a relative priority among each operating configuration of the set of operating configurations. Additionally or alternatively, the priority indication may indicate a first priority for the first operating configuration when UE 115-*d* is in a connected mode, a second priority for the first operating configuration when UE 115-*d* is in an idle mode or an inactive mode, or both. Additionally or alternatively, the priority indication may indicate a first relative priority among each operating configuration of the set of operating configurations when UE 115-*d* is in a connected mode, a second relative priority among each operating configuration of the set of operating configurations when UE 115-*d* is in an idle mode or an inactive mode, or both.

In some examples, UE 115-*d* may transmit an RRC setup request message, an RRC resume request message, or a measurement report that includes the priority indication. Additionally or alternatively, UE 115-*d* may transmit RRC signaling including the priority indication. The at least one operating configuration may include an SA FDD mode, an SA TDD mode, an F+T CA mode, an NSA mode, a shared mode in which one or both of a time resource or a frequency resource are shared by multiple RATs, or any combination thereof.

At 515, base station 105-*e* may transmit a configuration indication that indicates to communicate according to a first operating configuration of the set of operating configurations based on the priority indication for the at least one operating configuration. UE 115-*d* may receive the configuration indication. In some examples, base station 105-*e* may transmit an RRC control setup message, an RRC resume message, or an RRC reconfiguration message that includes the configuration indication. In some examples, the first operating configuration indicated by the configuration indication may be the at least one operating configuration indicated by the priority indication. In some such examples, the first operating configuration may have a highest priority among each operating configuration of the set of operating configurations. Alternatively, the first operating configuration may be one of two or more operating configurations, where a second operating configuration of the two or more operating configurations has a higher priority than the first operating configuration. In some such examples, base station 105-*e* may determine that the second operating configuration is unsupported at base station 105-*e* and may transmit the configuration indication based on determining that the second operating configuration is unsupported at base station 105-*e*.

At 520, UE 115-*d* may communicate the data traffic with base station 105-*e* based on the first operating configuration.

In some examples, UE 115-*d* may switch from the connected mode to an idle mode or an inactive mode. UE 115-*d* may identify one or more frequencies, one or more cells, or both based on the switching and may select one of the one or more frequencies, one of the one or more cells, or both, based on priority information associated with the priority indication. In some examples, the one of the one or more cells may include a cell associated with a base station 105 different from base station 105-*e*, the one of the one or more frequencies may include a frequency associated with the base station 105 different from base station 105-*e*, or both. In such examples, UE 115-*d* may initiate communications with the base station 105 different from base station 105-*e* based on selecting the cell associated with the base station 105 different from base station 105-*e*, selecting the frequency associated with the base station 105 different from base station 105-*e*, or both. Alternatively, the one of the one or more cells may include a cell associated with base station 105-*e*, the one of the one or more frequencies may include a frequency associated with base station 105-*e*, or both. In such examples, UE 115-*d* may maintain a connection with base station 105-*e* based on selecting the cell associated with base station 105-*e*, the frequency associated with base station 105-*e*, or both.

Figure 6:
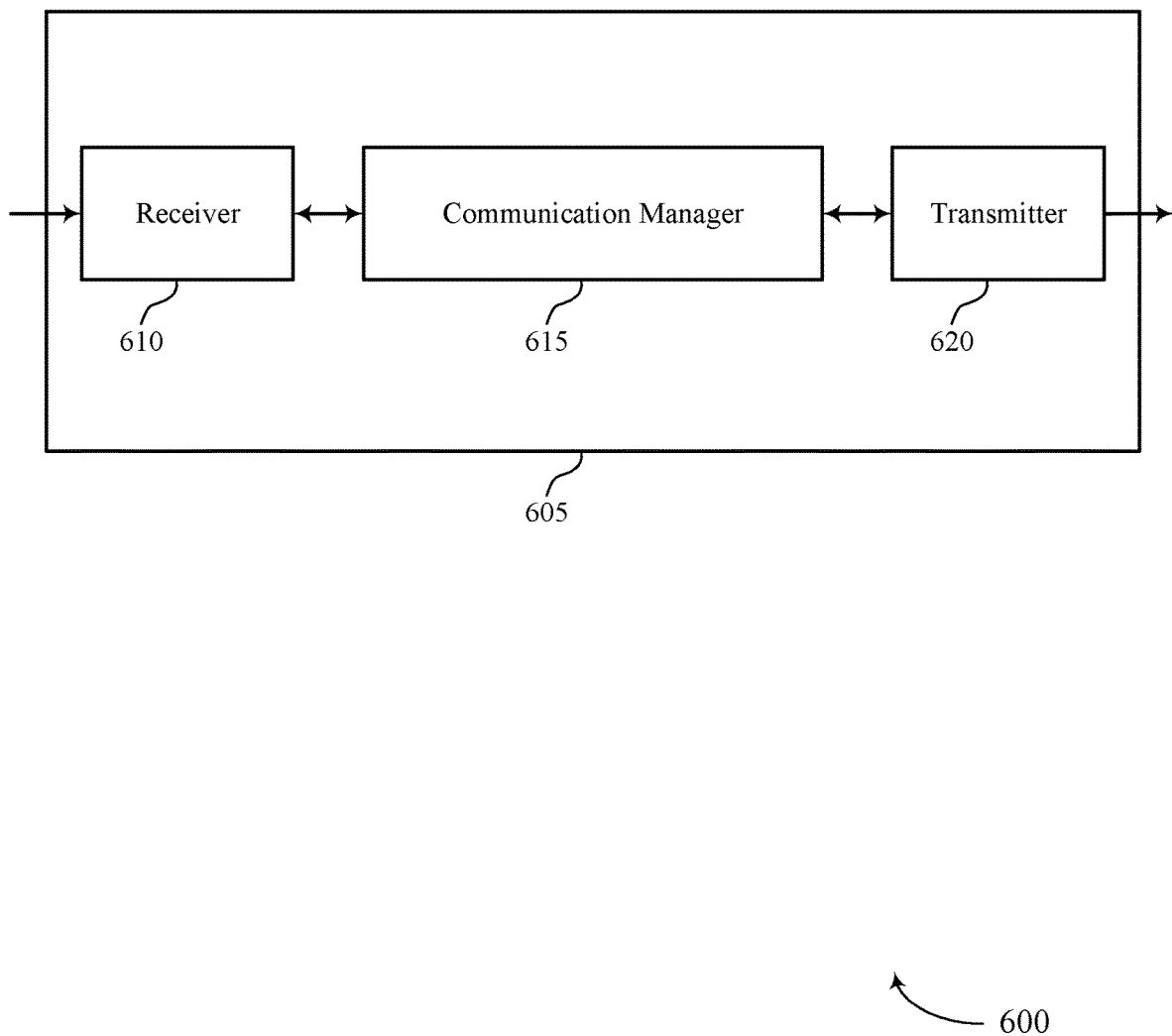
FIGS. 6 and 7 show block diagrams of devices that support an indication of operating configuration priorities in accordance with aspects of the present disclosure.

FIG. 6 shows a block diagram 600 of a device 605 that supports an indication of operating configuration priorities in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to indication of operating configuration priorities, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive, from a base station, a bandwidth size indication that indicates a respective bandwidth size configured for each operating configuration of a set of operating configurations supported at the UE; transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic; receive, from the base station, a configuration indication that indicates to communicate according to a first operating configuration of the set of operating configurations based on the priority indication for the at least one operating configuration; and communicate the data traffic with the base station based on the first operating configuration. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

By including or configuring the communication manager 615 in accordance with examples as described herein, the device 605 may support techniques for an indication of operating configuration priorities which may meet service latency and throughput constraints with less battery consumption. The techniques described herein may support high reliability and low latency communications, among other benefits.

Figure 7:
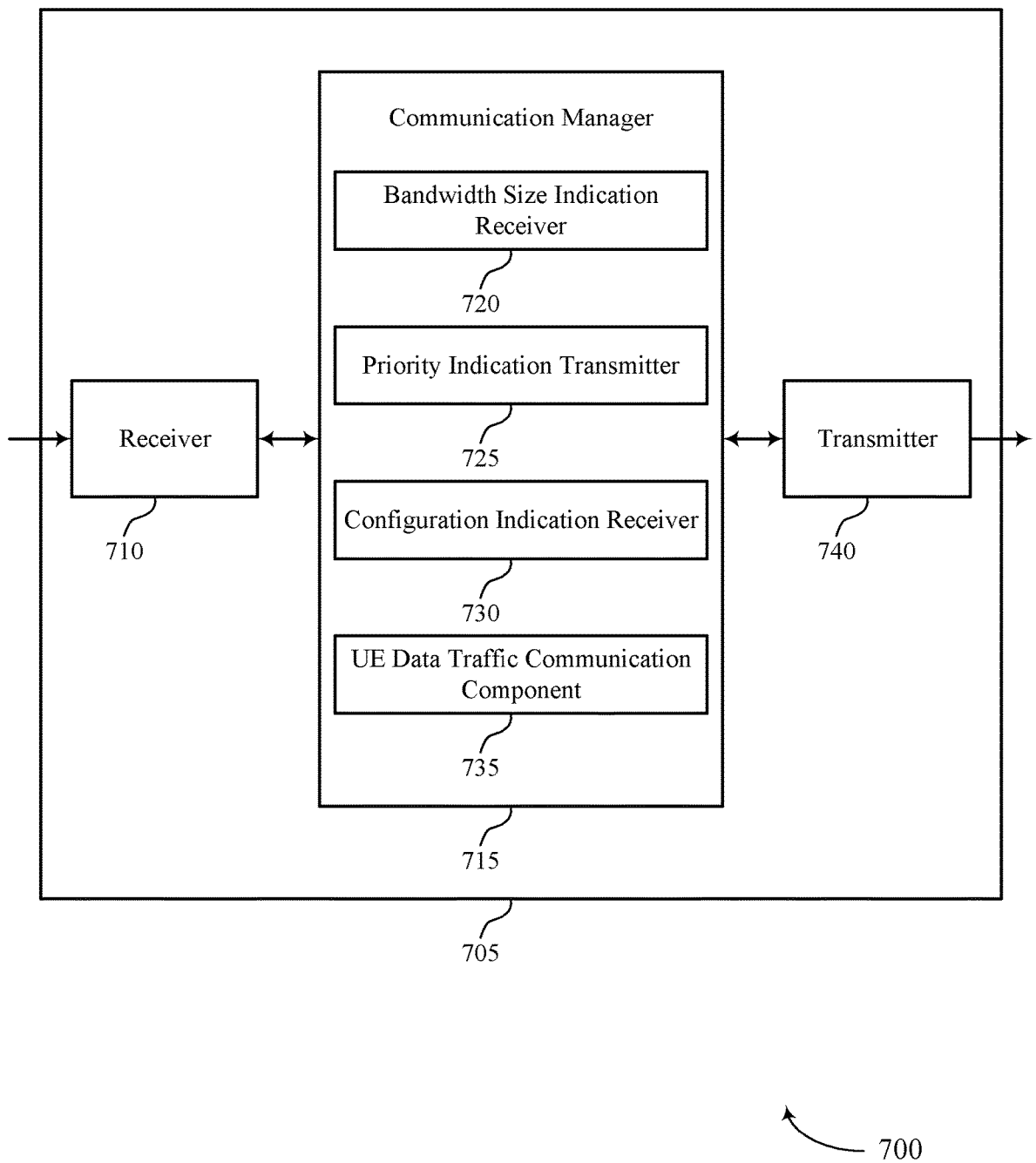

FIG. 7 shows a block diagram 700 of a device 705 that supports an indication of operating configuration priorities in accordance with aspects of the present disclosure. The device 705 may be an example of aspects of a device 605, or a UE 115 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to indication of operating configuration priorities, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a bandwidth size indication receiver 720, a priority indication transmitter 725, a configuration indication receiver 730, and a UE data traffic communication component 735. The communication manager 715 may be an example of aspects of the communication manager 910 described herein.

The bandwidth size indication receiver 720 may receive, from a base station, a bandwidth size indication that indicates a respective bandwidth size configured for each operating configuration of a set of operating configurations supported at the UE. The bandwidth size indication receiver 720 may receive, from the base station, the bandwidth size indication that indicates a plurality of bandwidth sizes configured for each operating configuration of the plurality of operating configurations supported at the UE.

The priority indication transmitter 725 may transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic.

The priority indication transmitter 725 may transmit, to the base station, a priority indication for the at least one operating configuration corresponding to a bandwidth size of the at least one operating configuration satisfying a power consumption criterion, an overheating criterion, or both. In some cases, the priority indication transmitter 725 may transmit the priority indication that indicates a higher priority for a first operation configuration of the plurality of operating configurations that has a first BWP comprising an SSB than a second operation configuration of the plurality of operating configurations that has a second BWP without an SSB.

The configuration indication receiver 730 may receive, from the base station, a configuration indication that indicates to communicate according to a first operating configuration of the set of operating configurations based on the priority indication for the at least one operating configuration.

The UE data traffic communication component 735 may communicate the data traffic with the base station based on the first operating configuration.

The transmitter 740 may transmit signals generated by other components of the device 705. In some examples, the transmitter 740 may be collocated with a receiver 710 in a transceiver module. For example, the transmitter 740 may be an example of aspects of the transceiver 915 described with reference to FIG. 9. The transmitter 740 may utilize a single antenna or a set of antennas.

Figure 8:
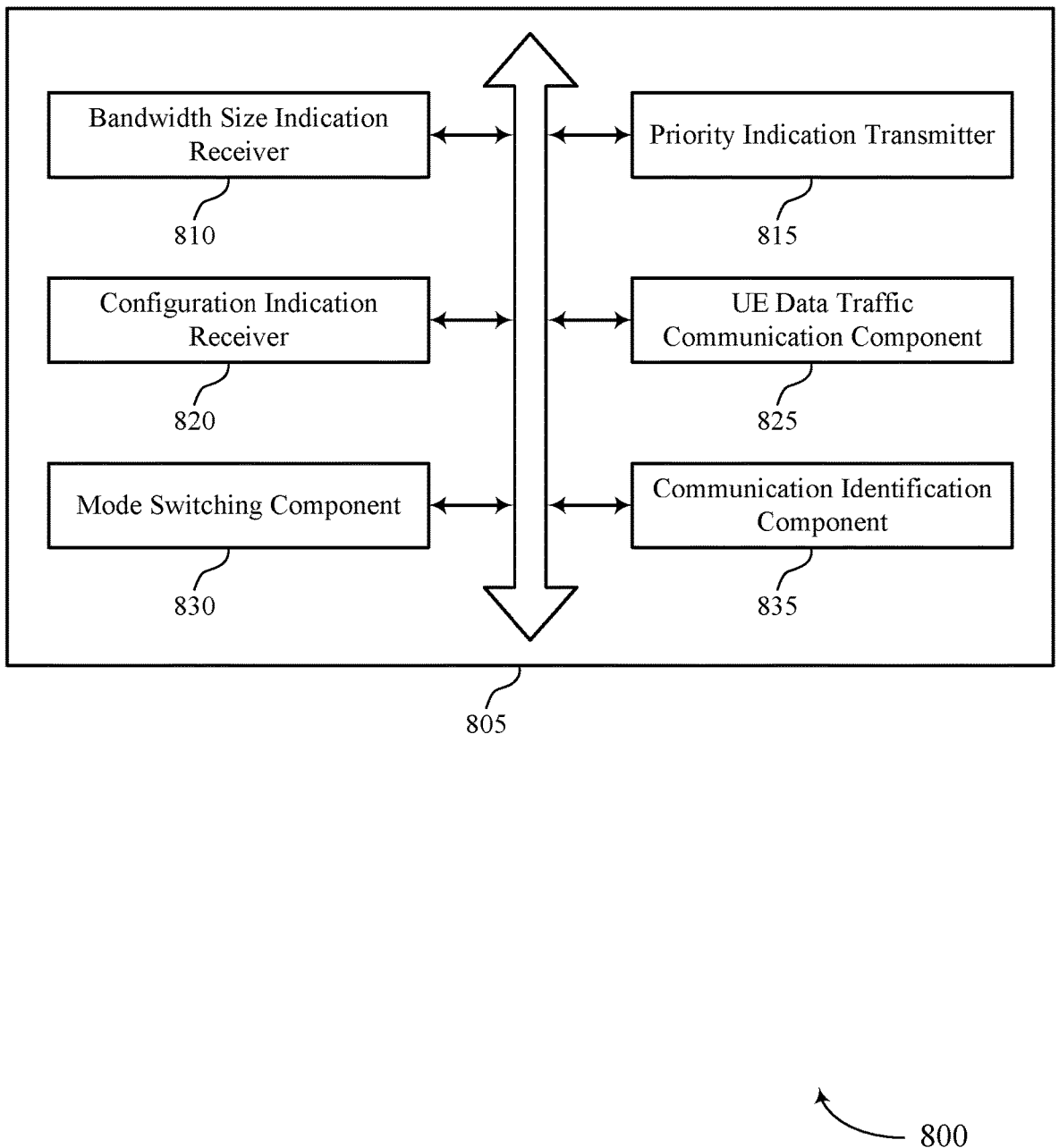
FIG. 8 shows a block diagram of a communication manager that supports an indication of operating configuration priorities in accordance with aspects of the present disclosure.

FIG. 8 shows a block diagram 800 of a communication manager 805 that supports an indication of operating configuration priorities in accordance with aspects of the present disclosure. The communication manager 805 may be an example of aspects of a communication manager 615, a communication manager 715, or a communication manager 910 described herein. The communication manager 805 may include a bandwidth size indication receiver 810, a priority indication transmitter 815, a configuration indication receiver 820, a UE data traffic communication component 825, a mode switching component 830, and a communication identification component 835. Each of these modules may communicate, directly or indirectly, with one another (e.g., via one or more buses).

The bandwidth size indication receiver 810 may receive, from a base station, a bandwidth size indication that indicates a respective bandwidth size configured for each operating configuration of a set of operating configurations supported at the UE. The bandwidth size indication receiver 810 may receive, from the base station, the bandwidth size indication that indicates a plurality of bandwidth sizes configured for each operating configuration of the plurality of operating configurations supported at the UE.

The priority indication transmitter 815 may transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic. In some examples, the priority indication transmitter 815 may transmit, to the base station, a priority indication for the at least one operating configuration corresponding to a bandwidth size of the at least one operating configuration satisfying a power consumption criterion, an overheating criterion, or both. In some examples, the priority indication transmitter 815 may transmit the priority indication that indicates a higher priority for a first operation configuration of the plurality of operating configurations that has a first BWP comprising an SSB than a second operation configuration of the plurality of operating configurations that has a second BWP without an SSB. In some examples, the priority indication transmitter 815 may transmit the priority indication that indicates a relative priority among each operating configuration of the set of operating configurations. In some examples, the priority indication transmitter 815 may transmit the priority indication that indicates a first priority for the first operating configuration when the UE is in a connected mode, a second priority for the first operating configuration when the UE is in an idle mode or an inactive mode, or both. In some examples, the priority indication transmitter 815 may transmit the priority indication that indicates a first relative priority among each operating configuration of the set of operating configurations when the UE is in a connected mode, a second relative priority among each operating configuration of the set of operating configurations when the UE is in an idle mode or an inactive mode, or both.

In some examples, the priority indication transmitter 815 transmitting the priority indication may involve the priority indication transmitter 815 transmitting an RRC setup request message, an RRC resume request message, or a measurement report that includes the priority indication. In some examples, the priority indication transmitter 815 may transmit RRC signaling including the priority indication. In some examples, the priority indication transmitter 815 may transmit the priority indication when the UE is in a connected mode. In some cases, the at least one operating configuration includes an SA FDD mode, an SA TDD mode, an FDD and TDD carrier aggregation mode, an NSA mode, a shared resource mode in which one or both of a time resource or a frequency resource are shared by multiple RATs, or any combination thereof.

The configuration indication receiver 820 may receive, from the base station, a configuration indication that indicates to communicate according to a first operating configuration of the set of operating configurations based on the priority indication for the at least one operating configuration. In some examples, the configuration indication receiver 820 receiving the configuration indication may involve the configuration indication receiver 820 receiving an RRC setup message, an RRC resume message, or an RRC reconfiguration message that includes the configuration indication. In some examples, the configuration indication receiver 820 may receive the configuration indication that indicates to communicate according to the first operating configuration that is the at least one operating configuration, where the first operating configuration has a highest priority among each operating configuration of the set of operating configurations. In some examples, the at least one operating configuration may include two or more operating configurations. In some such examples, the configuration indication receiver 820 may receive the configuration indication that indicates to communicate according to the first operating configuration that is one of the two or more operating configurations, and where a second operating configuration of the two or more operating configurations has a higher priority than the first operating configuration.

The UE data traffic communication component 825 may communicate the data traffic with the base station based on the first operating configuration.

The mode switching component 830 may switch from the connected mode to an idle mode or an inactive mode.

The communication identification component 835 may identify one or more frequencies, one or more cells, or both based on the switching. In some examples, the communication identification component 835 may select one of the one or more frequencies, one of the one or more cells, or both based on priority information associated with the priority indication. In some examples, the one of the one or more cells may include a cell associated with a second base station, the one of the one or more frequencies may include a frequency associated with the second base station, or both. In some such examples, the communication identification component 835 may initiate communications with the second base station based on selecting the cell associated with the second base station, the frequency associated with the second base station, or both. In some examples, the one of the one or more cells includes a cell associated with the base station, the one of the one or more frequencies includes a frequency associated with the base station, or both. In some such examples, the communication identification component 835 may maintain a connection with the base station based on selecting the cell associated with the base station, the frequency associated with the base station, or both.

Figure 9:
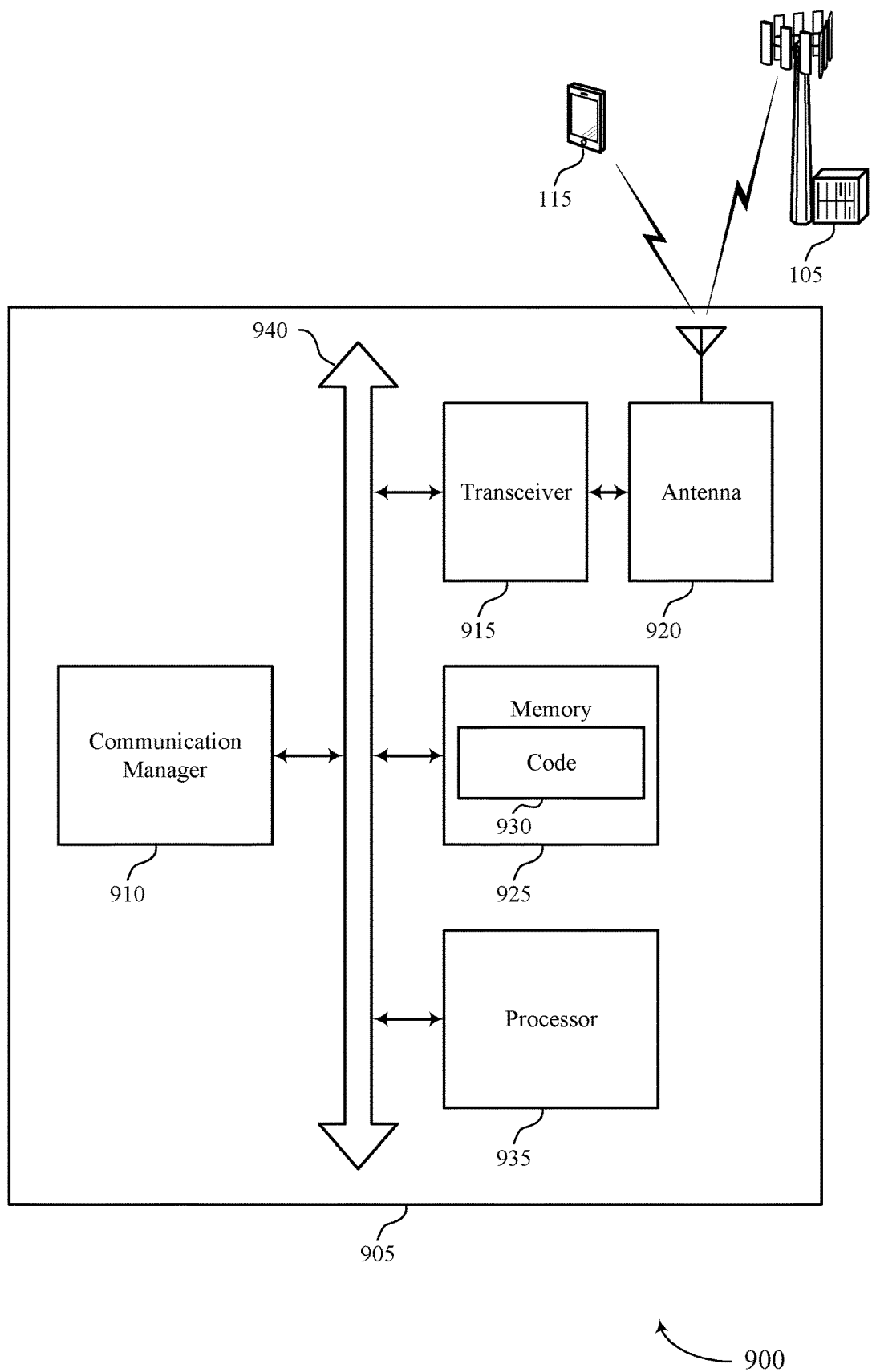
FIG. 9 shows a diagram of a system including a device that supports an indication of operating configuration priorities in accordance with aspects of the present disclosure.

FIG. 9 shows a diagram of a system 900 including a device 905 that supports an indication of operating configuration priorities in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive, from a base station, a bandwidth size indication that indicates a respective bandwidth size configured for each operating configuration of a set of operating configurations supported at the UE; transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic; receive, from the base station, a configuration indication that indicates to communicate according to a first operating configuration of the set of operating configurations based on the priority indication for the at least one operating configuration; and communicate the data traffic with the base station based on the first operating configuration.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

Figure 10:
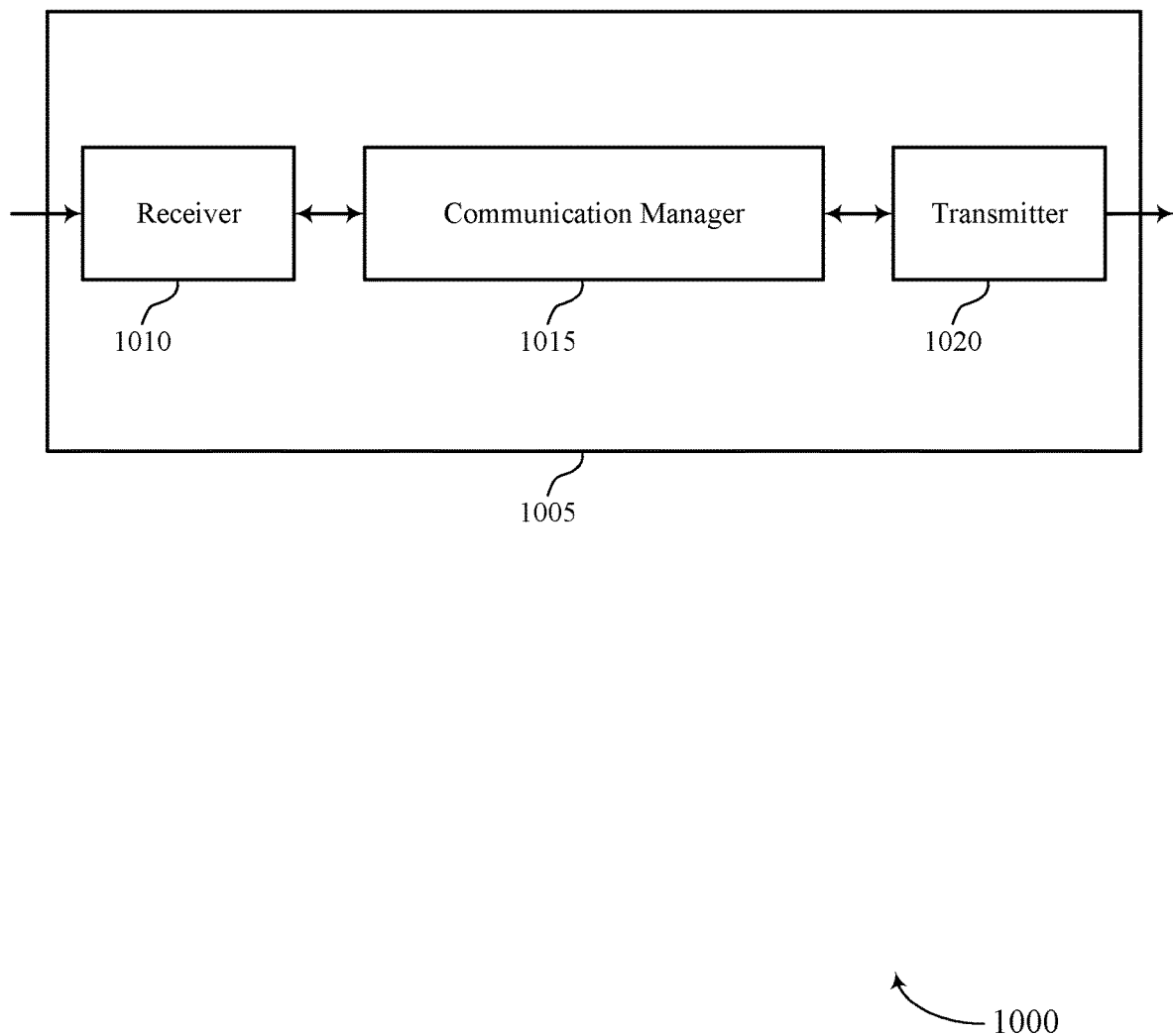
FIGS. 10 and 11 show block diagrams of devices that support an indication of operating configuration priorities in accordance with aspects of the present disclosure.

The processor 935 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting indication of operating configuration priorities). FIG. 10 shows a block diagram 1000 of a device 1005 that supports an indication of operating configuration priorities in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of operating configuration priorities, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit, to a UE, a bandwidth size indication that indicates a respective bandwidth size configured for each operating configuration of a set of operating configurations; receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic; transmit, to the UE, a configuration indication that indicates to communicate according to a first operating configuration of the set of operating configurations based on the priority indication for the at least one operating configuration; and communicate the data traffic with the UE based on the first operating configuration. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

By including or configuring the communication manager 1015 in accordance with examples as described herein, the device 1005 may support techniques for an indication of operating configuration priorities which may meet service latency and throughput constraints with less battery consumption. The techniques described herein may support high reliability and low latency communications, among other benefits.

Figure 11:
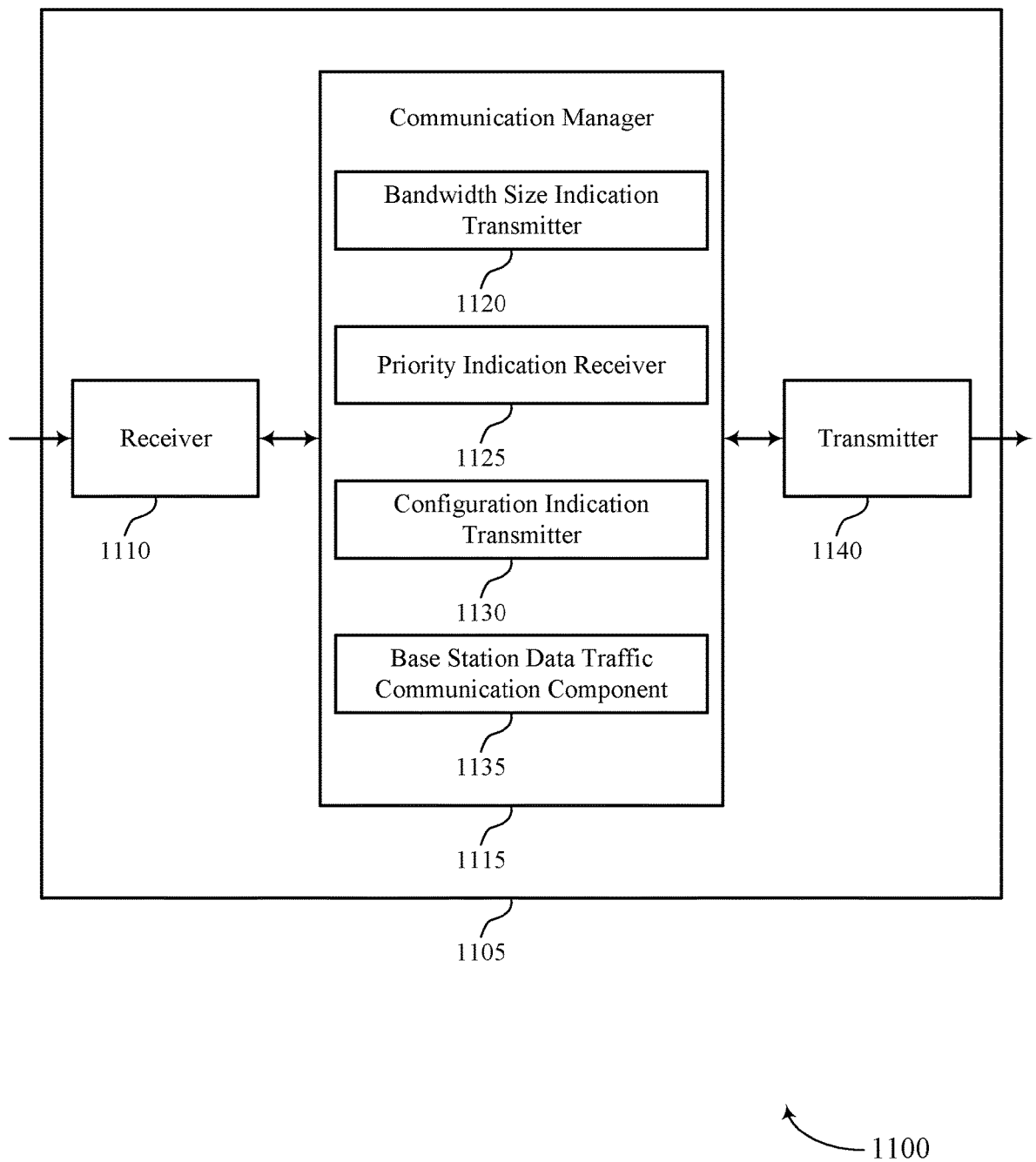

FIG. 11 shows a block diagram 1100 of a device 1105 that supports an indication of operating configuration priorities in accordance with aspects of the present disclosure. The device 1105 may be an example of aspects of a device 1005, or a base station 105 as described herein. The device 1105 may include a receiver 1110, a communication manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to indication of operating configuration priorities, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a bandwidth size indication transmitter 1120, a priority indication receiver 1125, a configuration indication transmitter 1130, and a base station data traffic communication component 1135. The communication manager 1115 may be an example of aspects of the communication manager 1310 described herein.

The bandwidth size indication transmitter 1120 may transmit, to a UE, a bandwidth size indication that indicates a respective bandwidth size configured for each operating configuration of a set of operating configurations. The bandwidth size indication transmitter 1120 may transmit, to the UE, the bandwidth size indication that indicates a plurality of bandwidth sizes configured for each operating configuration of the plurality of operating configurations supported at the UE.

The priority indication receiver 1125 may receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic. The priority indication receiver 1125 may receive, from the UE, a priority indication for the at least one operating configuration corresponding to a bandwidth size of the at least one operating configuration satisfying a power consumption criterion, an overheating criterion, or both. In some examples, the priority indication receiver 1125 may receive the priority indication that indicates a higher priority for a first operation configuration of the plurality of operating configurations that has a first BWP comprising an SSB than a second operation configuration of the plurality of operating configurations that has a second BWP without an SSB.

The configuration indication transmitter 1130 may transmit, to the UE, a configuration indication that indicates to communicate according to a first operating configuration of the set of operating configurations based on the priority indication for the at least one operating configuration.

The base station data traffic communication component 1135 may communicate the data traffic with the UE based on the first operating configuration.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
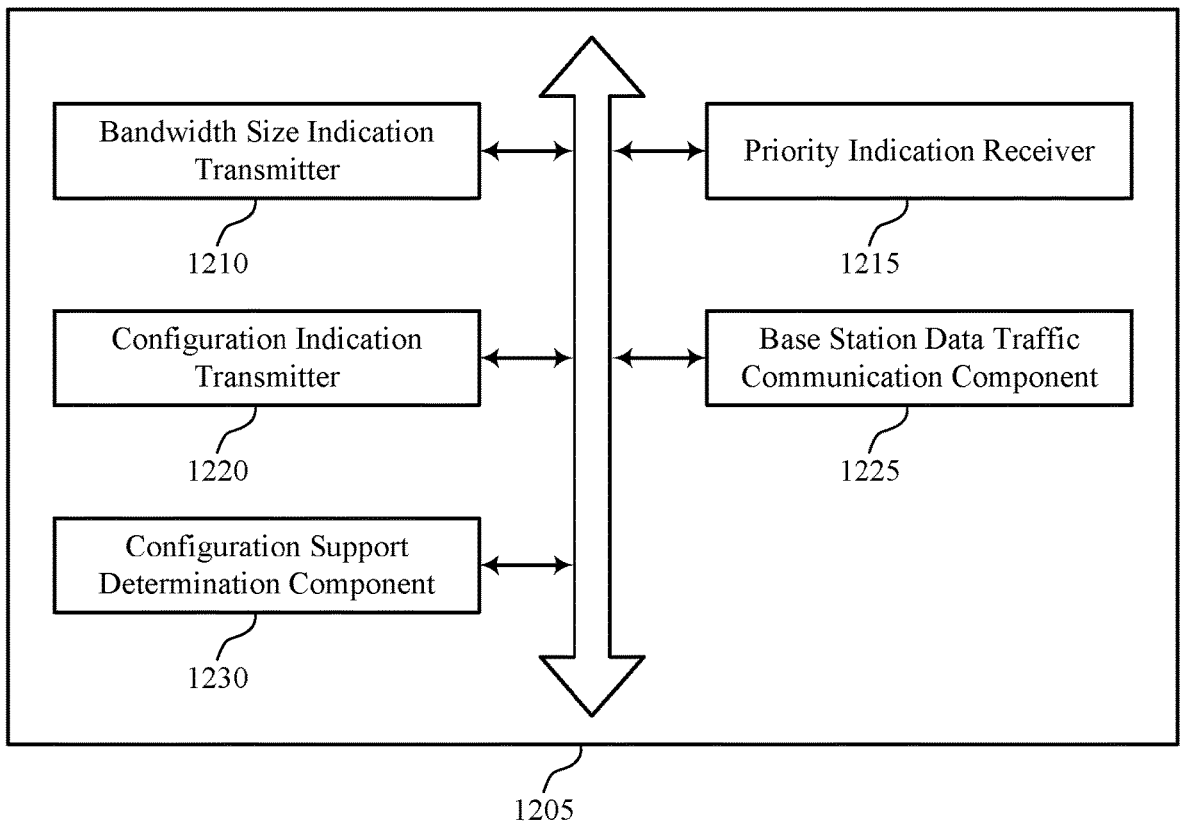
FIG. 12 shows a block diagram of a communication manager that supports an indication of operating configuration priorities in accordance with aspects of the present disclosure.

FIG. 12 shows a block diagram 1200 of a communication manager 1205 that supports an indication of operating configuration priorities in accordance with aspects of the present disclosure. The communication manager 1205 may be an example of aspects of a communication manager 1015, a communication manager 1115, or a communication manager 1310 described herein. The communication manager 1205 may include a bandwidth size indication transmitter 1210, a priority indication receiver 1215, a configuration indication transmitter 1220, a base station data traffic communication component 1225, and a configuration support determination component 1230. Each of these modules may communicate, directly or indirectly, with one another (e.g., via one or more buses).

The bandwidth size indication transmitter 1210 may transmit, to a UE, a bandwidth size indication that indicates a respective bandwidth size configured for each operating configuration of a set of operating configurations. The bandwidth size indication transmitter 1210 may transmit, to the UE, the bandwidth size indication that indicates a plurality of bandwidth sizes configured for each operating configuration of the plurality of operating configurations supported at the UE.

The priority indication receiver 1215 may receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic. In some examples, the priority indication receiver 1215 may receive, from the UE, a priority indication for the at least one operating configuration corresponding to a bandwidth size of the at least one operating configuration satisfying a power consumption criterion, an overheating criterion, or both. In some examples, the priority indication receiver 1215 may receive the priority indication that indicates a higher priority for a first operation configuration of the plurality of operating configurations that has a first BWP comprising an SSB than a second operation configuration of the plurality of operating configurations that has a second BWP without an SSB. In some examples, the priority indication receiver 1215 may receive the priority indication that indicates a relative priority among each operating configuration of the set of operating configurations. In some examples, the priority indication receiver 1215 may receive the priority indication that indicates a first priority for the first operating configuration when the UE is in a connected mode, a second priority for the first operating configuration when the UE is in an idle mode or an inactive mode, or both. In some examples, the priority indication receiver 1215 may receive the priority indication that indicates a first relative priority among each operating configuration of the set of operating configurations when the UE is in a connected mode, a second relative priority among each operating configuration of the set of operating configurations when the UE is in an idle mode or an inactive mode, or both.

In some examples, the priority indication receiver 1215 receiving the priority indication may involve the priority indication receiver 1215 receiving an RRC setup request message, an RRC resume request message, or a measurement report that includes the priority indication. In some examples, the priority indication receiver 1215 may receive RRC signaling including the priority indication. In some cases, the at least one operating configuration includes an SA FDD mode, an SA TDD mode, an FDD and TDD carrier aggregation mode, an NSA mode, a shared resource mode in which one or both of a time resource or a frequency resource are shared by multiple RATs, or any combination thereof.

The configuration indication transmitter 1220 may transmit, to the UE, a configuration indication that indicates to communicate according to a first operating configuration of the set of operating configurations based on the priority indication for the at least one operating configuration. In some examples, the configuration indication transmitter 1220 transmitting the configuration indication may involve the configuration indication transmitter 1220 transmitting an RRC setup message, an RRC resume message, or an RRC reconfiguration message that includes the configuration indication. In some examples, the configuration indication transmitter 1220 may transmit the configuration indication that indicates to communicate according to the first operating configuration that is the at least one operating configuration, where the first operating configuration has a highest priority among each operating configuration of the set of operating configurations. In some examples, the at least one operating configuration includes two or more operating configurations. In some such examples, the configuration indication transmitter 1220 may transmit the configuration indication that indicates to communicate according to the first operating configuration that is one of the two or more operating configurations, and where a second operating configuration of the two or more operating configurations has a higher priority than the first operating configuration. In some examples, the configuration indication transmitter 1220 may transmit the configuration indication that indicates to communicate according to the first operating configuration based on determining that the second operating configuration is unsupported at the base station.

The base station data traffic communication component 1225 may communicate the data traffic with the UE based on the first operating configuration.

The configuration support determination component 1230 may determine that the second operating configuration is unsupported at the base station.

Figure 13:
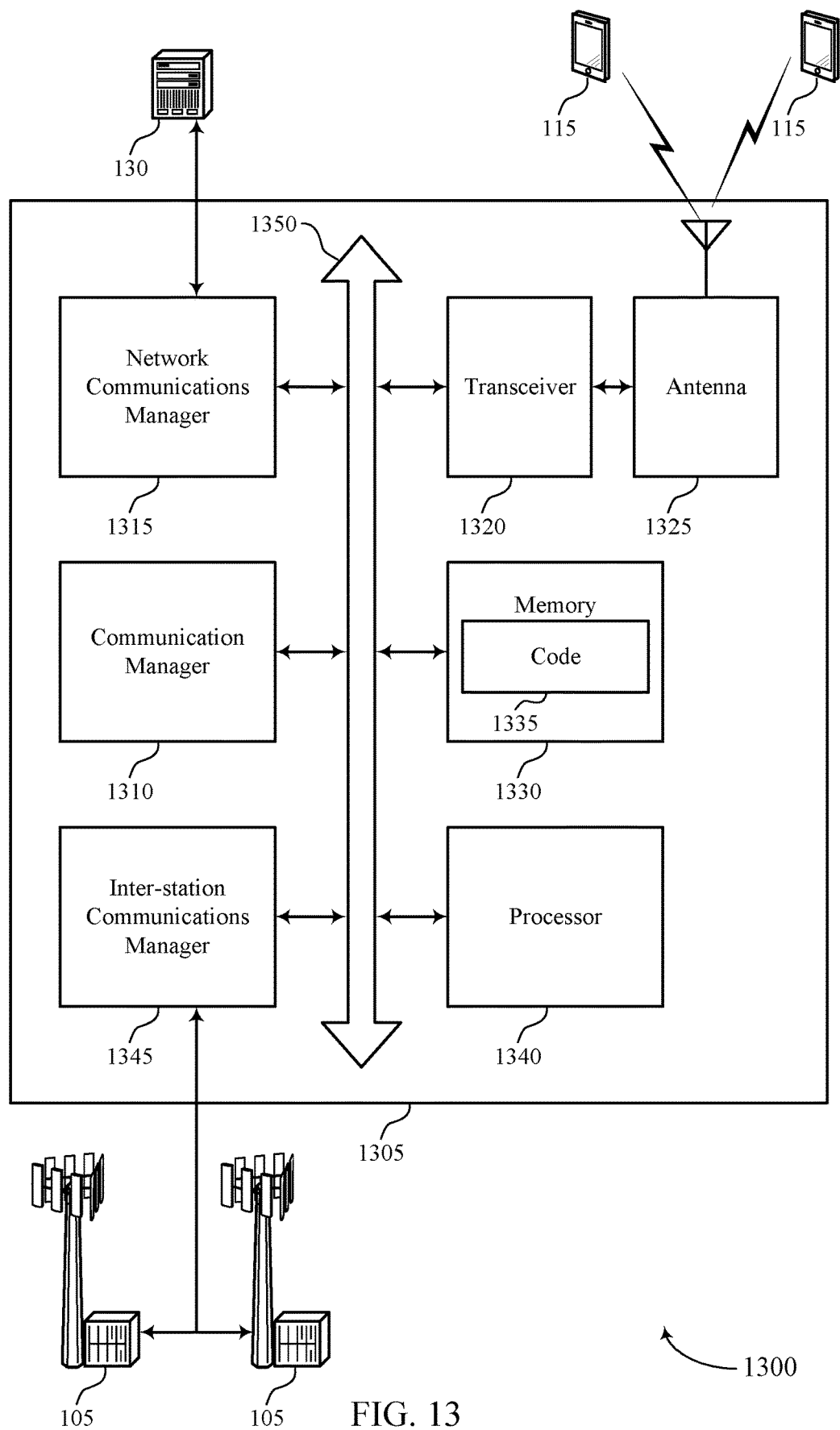
FIG. 13 shows a diagram of a system including a device that supports an indication of operating configuration priorities in accordance with aspects of the present disclosure.

FIG. 13 shows a diagram of a system 1300 including a device 1305 that supports an indication of operating configuration priorities in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit, to a UE, a bandwidth size indication that indicates a respective bandwidth size configured for each operating configuration of a set of operating configurations; receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic; transmit, to the UE, a configuration indication that indicates to communicate according to a first operating configuration of the set of operating configurations based on the priority indication for the at least one operating configuration; and communicate the data traffic with the UE based on the first operating configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting indication of operating configuration priorities).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
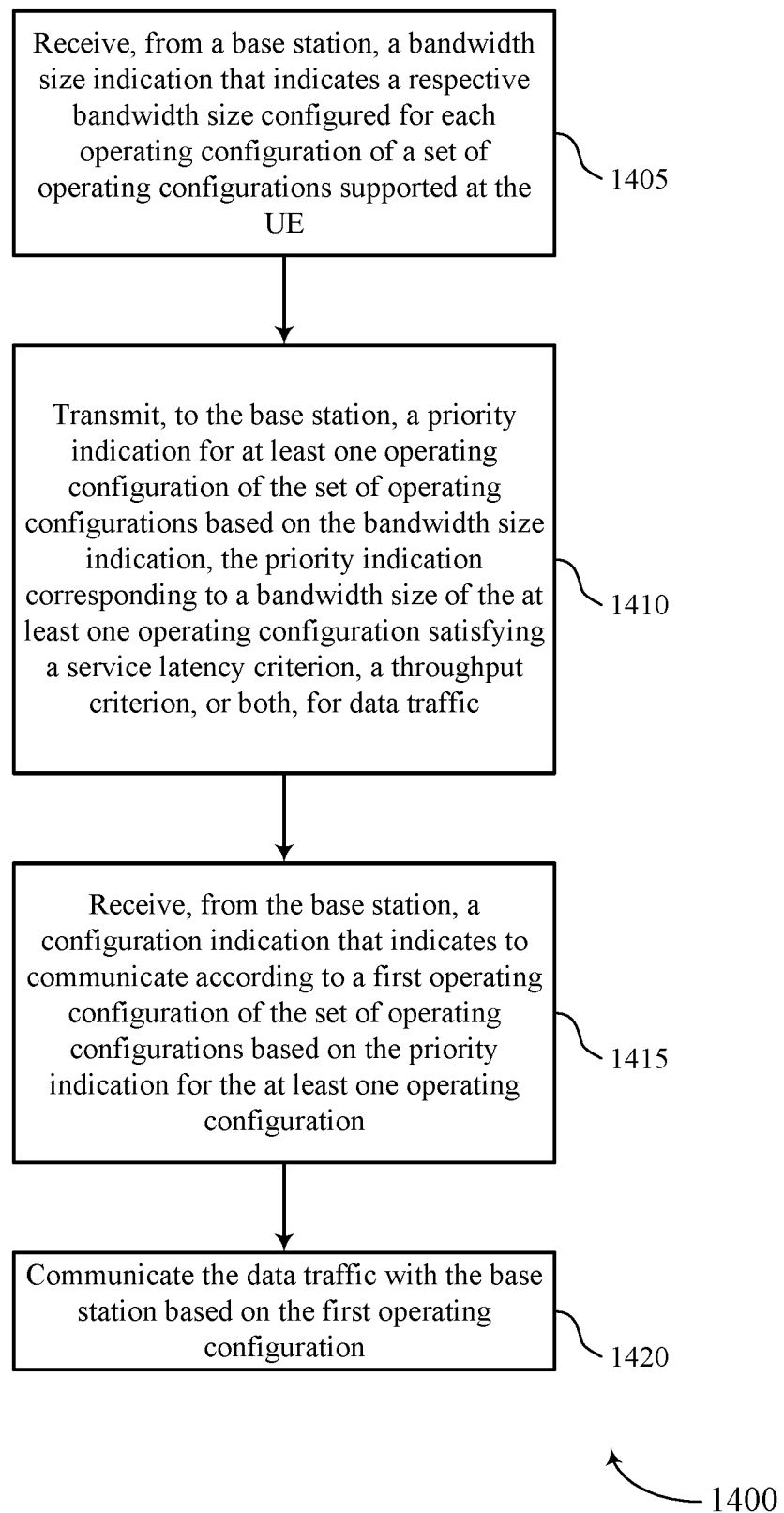
FIGS. 14 through 17 show flowcharts illustrating methods that support an indication of operating configuration priorities in accordance with aspects of the present disclosure.

FIG. 14 shows a flowchart illustrating a method 1400 that supports an indication of operating configuration priorities in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may receive, from a base station, a bandwidth size indication that indicates a respective bandwidth size configured for each operating configuration of a set of operating configurations supported at the UE. The operations of 1405 may be performed according to the methods described herein. In some examples, aspects of the operations of 1405 may be performed by a bandwidth size indication receiver as described with reference to FIGS. 6 through 9.

At 1410, the UE may transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic. The operations of 1410 may be performed according to the methods described herein. In some examples, aspects of the operations of 1410 may be performed by a priority indication transmitter as described with reference to FIGS. 6 through 9.

At 1415, the UE may receive, from the base station, a configuration indication that indicates to communicate according to a first operating configuration of the set of operating configurations based on the priority indication for the at least one operating configuration. The operations of 1415 may be performed according to the methods described herein. In some examples, aspects of the operations of 1415 may be performed by a configuration indication receiver as described with reference to FIGS. 6 through 9.

At 1420, the UE may communicate the data traffic with the base station based on the first operating configuration. The operations of 1420 may be performed according to the methods described herein. In some examples, aspects of the operations of 1420 may be performed by a UE data traffic communication component as described with reference to FIGS. 6 through 9.

Figure 15:
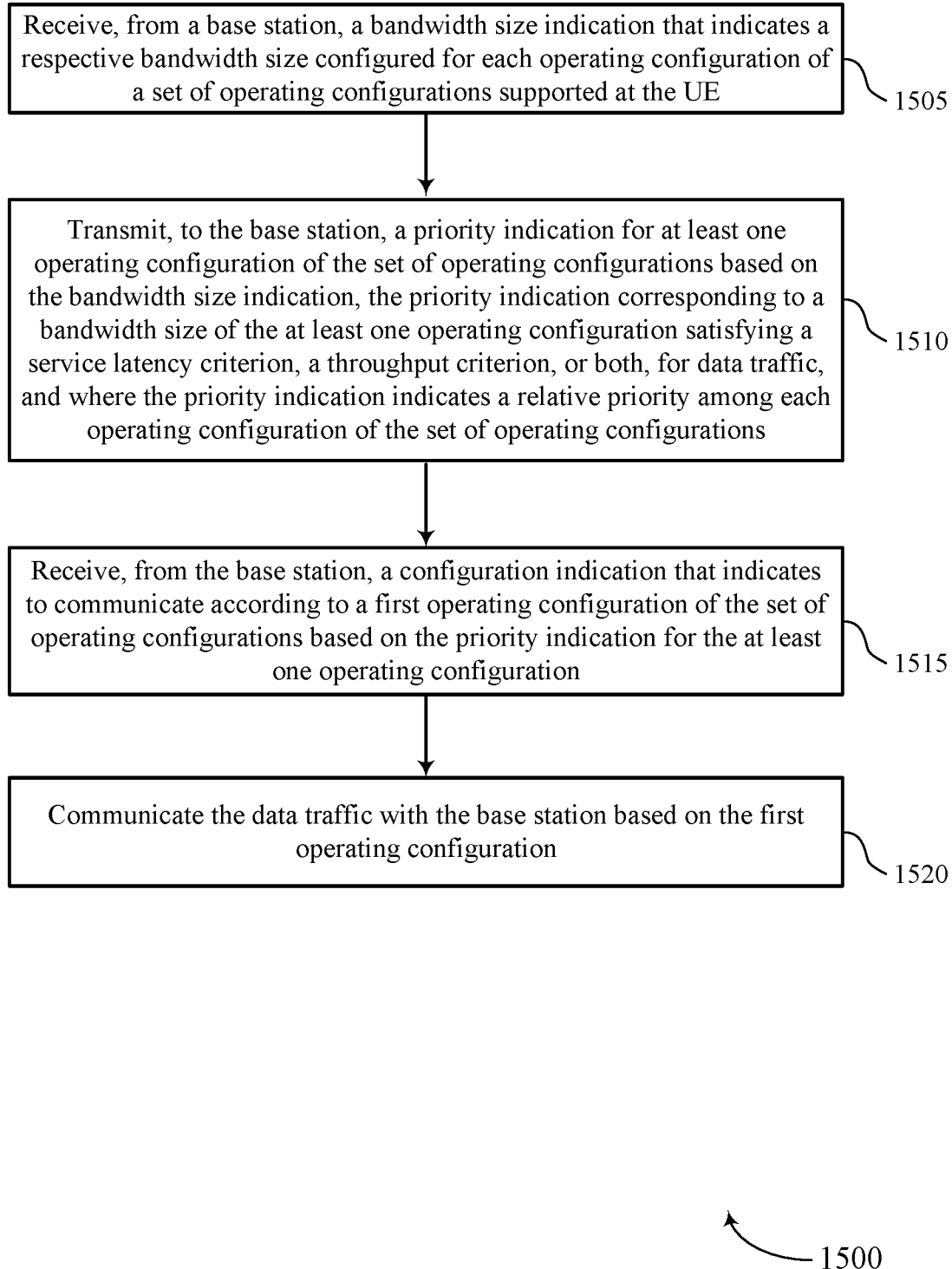

FIG. 15 shows a flowchart illustrating a method 1500 that supports an indication of operating configuration priorities in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive, from a base station, a bandwidth size indication that indicates a respective bandwidth size configured for each operating configuration of a set of operating configurations supported at the UE. The operations of 1505 may be performed according to the methods described herein. In some examples, aspects of the operations of 1505 may be performed by a bandwidth size indication receiver as described with reference to FIGS. 6 through 9.

At 1510, the UE may transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, and where the priority indication indicates a relative priority among each operating configuration of the set of operating configurations. The operations of 1510 may be performed according to the methods described herein. In some examples, aspects of the operations of 1510 may be performed by a priority indication transmitter as described with reference to FIGS. 6 through 9.

At 1515, the UE may receive, from the base station, a configuration indication that indicates to communicate according to a first operating configuration of the set of operating configurations based on the priority indication for the at least one operating configuration. The operations of 1515 may be performed according to the methods described herein. In some examples, aspects of the operations of 1515 may be performed by a configuration indication receiver as described with reference to FIGS. 6 through 9.

At 1520, the UE may communicate the data traffic with the base station based on the first operating configuration. The operations of 1520 may be performed according to the methods described herein. In some examples, aspects of the operations of 1520 may be performed by a UE data traffic communication component as described with reference to FIGS. 6 through 9.

Figure 16:
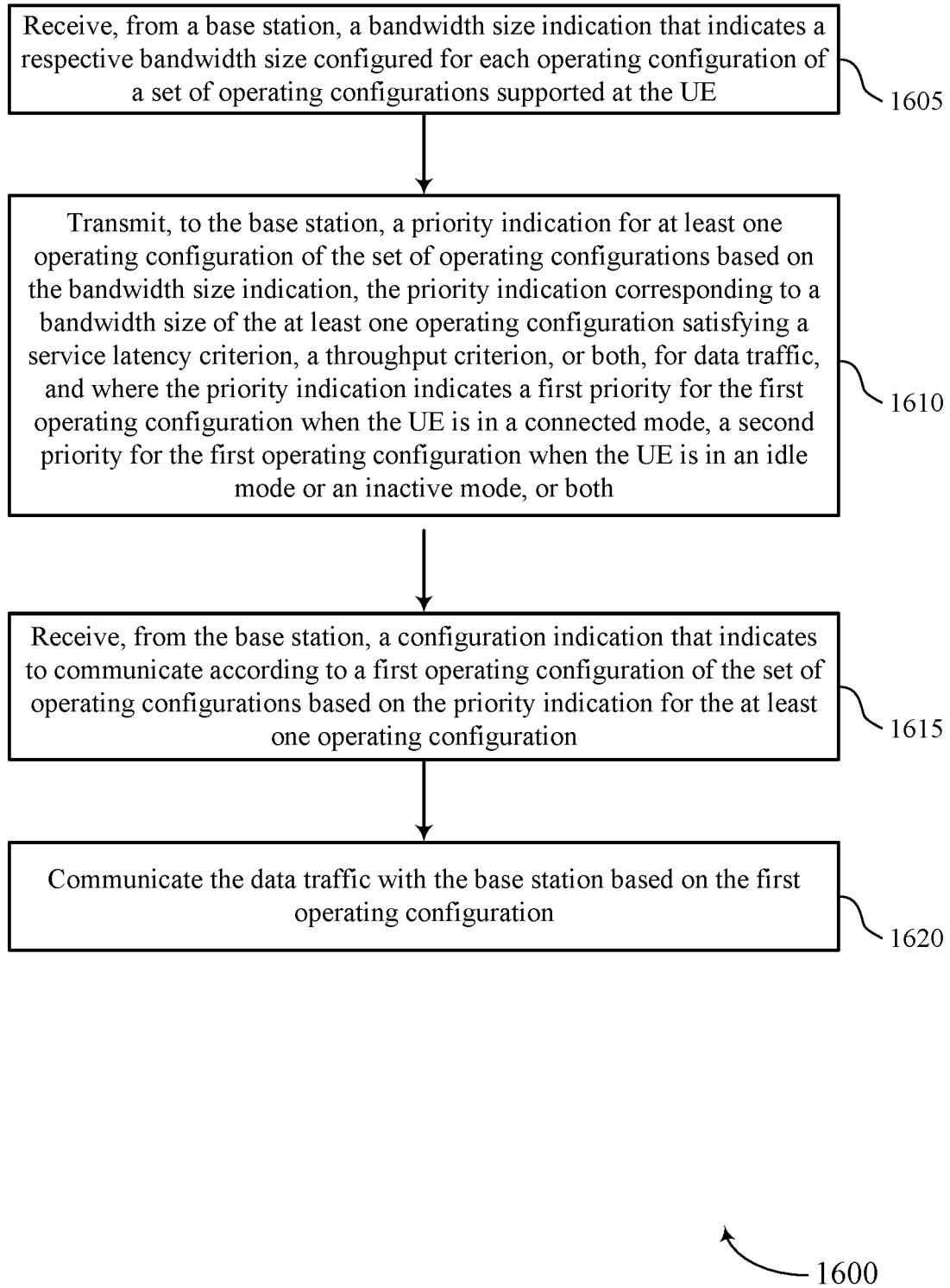

FIG. 16 shows a flowchart illustrating a method 1600 that supports an indication of operating configuration priorities in accordance with aspects of the present disclosure. The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1605, the UE may receive, from a base station, a bandwidth size indication that indicates a respective bandwidth size configured for each operating configuration of a set of operating configurations supported at the UE. The operations of 1605 may be performed according to the methods described herein. In some examples, aspects of the operations of 1605 may be performed by a bandwidth size indication receiver as described with reference to FIGS. 6 through 9.

At 1610, the UE may transmit, to the base station, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic, and where the priority indication indicates a first priority for the first operating configuration when the UE is in a connected mode, a second priority for the first operating configuration when the UE is in an idle mode or an inactive mode, or both. The operations of 1610 may be performed according to the methods described herein. In some examples, aspects of the operations of 1610 may be performed by a priority indication transmitter as described with reference to FIGS. 6 through 9.

At 1615, the UE may receive, from the base station, a configuration indication that indicates to communicate according to a first operating configuration of the set of operating configurations based on the priority indication for the at least one operating configuration. The operations of 1615 may be performed according to the methods described herein. In some examples, aspects of the operations of 1615 may be performed by a configuration indication receiver as described with reference to FIGS. 6 through 9.

At 1620, the UE may communicate the data traffic with the base station based on the first operating configuration. The operations of 1620 may be performed according to the methods described herein. In some examples, aspects of the operations of 1620 may be performed by a UE data traffic communication component as described with reference to FIGS. 6 through 9.

Figure 17:
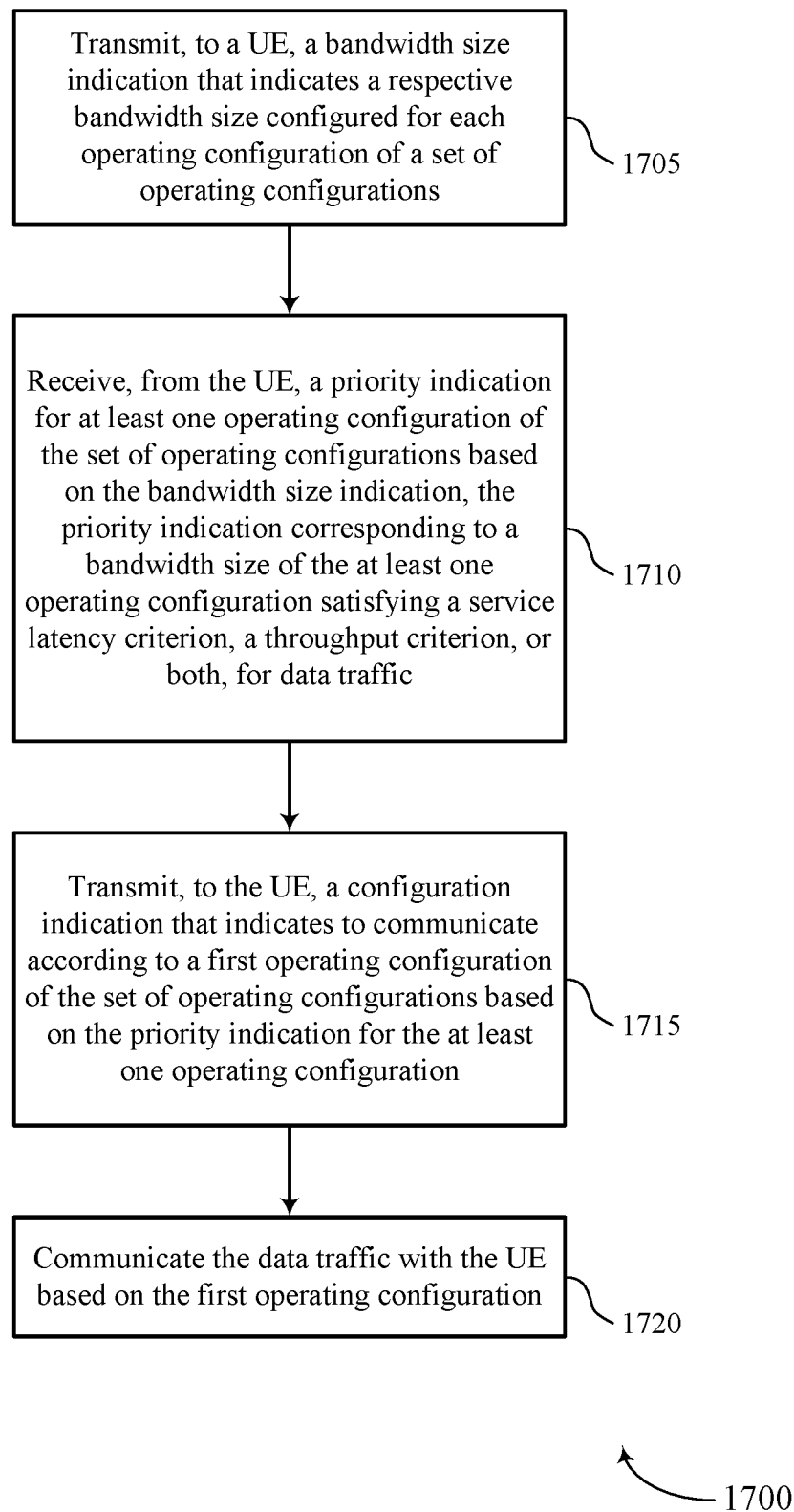

FIG. 17 shows a flowchart illustrating a method 1700 that supports an indication of operating configuration priorities in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1705, the base station may transmit, to a UE, a bandwidth size indication that indicates a respective bandwidth size configured for each operating configuration of a set of operating configurations. The operations of 1705 may be performed according to the methods described herein. In some examples, aspects of the operations of 1705 may be performed by a bandwidth size indication transmitter as described with reference to FIGS. 10 through 13.

At 1710, the base station may receive, from the UE, a priority indication for at least one operating configuration of the set of operating configurations based on the bandwidth size indication, the priority indication corresponding to a bandwidth size of the at least one operating configuration satisfying a service latency criterion, a throughput criterion, or both, for data traffic. The operations of 1710 may be performed according to the methods described herein. In some examples, aspects of the operations of 1710 may be performed by a priority indication receiver as described with reference to FIGS. 10 through 13.

At 1715, the base station may transmit, to the UE, a configuration indication that indicates to communicate according to a first operating configuration of the set of operating configurations based on the priority indication for the at least one operating configuration. The operations of 1715 may be performed according to the methods described herein. In some examples, aspects of the operations of 1715 may be performed by a configuration indication transmitter as described with reference to FIGS. 10 through 13.

At 1720, the base station may communicate the data traffic with the UE based on the first operating configuration. The operations of 1720 may be performed according to the methods described herein. In some examples, aspects of the operations of 1720 may be performed by a base station data traffic communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, a bandwidth size indication that indicates a respective bandwidth size configured for each operating configuration of a plurality of operating configurations supported at the UE; transmitting, to the base station, a priority indication for at least one operating configuration of the plurality of operating configurations based at least in part on the bandwidth size indication, the priority indication corresponding to a bandwidth size of the at least one operating configuration satisfying a service latency criterion, a throughput criterion, or both, for data traffic; receiving, from the base station, a configuration indication that indicates to communicate according to a first operating configuration of the plurality of operating configurations based at least in part on the priority indication for the at least one operating configuration; and communicating the data traffic with the base station based at least in part on the first operating configuration.

Aspect 2: The method of aspect 1, wherein transmitting the priority indication comprises: transmitting the priority indication that indicates a relative priority among each operating configuration of the plurality of operating configurations.

Aspect 3: The method of any of aspects 1 through 2, wherein transmitting the priority indication comprises: transmitting the priority indication that indicates a first priority for the first operating configuration when the UE is in a connected mode, a second priority for the first operating configuration when the UE is in an idle mode or an inactive mode, or both.

Aspect 4: The method of any of aspects 1 through 3, wherein transmitting the priority indication comprises: transmitting the priority indication that indicates a first relative priority among each operating configuration of the plurality of operating configurations when the UE is in a connected mode, a second relative priority among each operating configuration of the plurality of operating configurations when the UE is in an idle mode or an inactive mode, or both.

Aspect 5: The method of any of aspects 1 through 4, wherein transmitting the priority indication comprises: transmitting an RRC setup request message, an RRC resume request message, or a measurement report that comprises the priority indication.

Aspect 6: The method of any of aspects 1 through 5, wherein receiving the configuration indication comprises: receiving an RRC setup message, an RRC resume message, or an RRC reconfiguration message that comprises the configuration indication.

Aspect 7: The method of any of aspects 1 through 6, wherein transmitting the priority indication comprises: transmitting RRC signaling comprising the priority indication.

Aspect 8: The method of any of aspects 1 through 7, wherein receiving the configuration indication comprises: receiving the configuration indication that indicates to communicate according to the first operating configuration that is the at least one operating configuration, wherein the first operating configuration has a highest priority among each operating configuration of the plurality of operating configurations.

Aspect 9: The method of any of aspects 1 through 8, wherein the at least one operating configuration comprises two or more operating configurations, and wherein receiving the configuration indication comprises: receiving the configuration indication that indicates to communicate according to the first operating configuration that is one of the two or more operating configurations, and wherein a second operating configuration of the two or more operating configurations has a higher priority than the first operating configuration.

Aspect 10: The method of any of aspects 1 through 9, wherein the UE transmits the priority indication when in a connected mode.

Aspect 11: The method of any of aspects 1 through 10, further comprising: switching from the connected mode to an idle mode or an inactive mode; identifying one or more frequencies, one or more cells, or both based at least in part on the switching; and selecting one of the one or more frequencies, one of the one or more cells, or both based at least in part on priority information associated with the priority indication.

Aspect 12: The method of aspect 11, wherein the one of the one or more cells comprises a cell associated with a second base station, the one of the one or more frequencies comprises a frequency associated with the second base station, or both, the method further comprising: initiating communications with the second base station based at least in part on selecting the cell associated with the second base station, the frequency associated with the second base station, or both.

Aspect 13: The method of any of aspects 11 through 12, wherein the one of the one or more cells comprises a cell associated with the base station, the one of the one or more frequencies comprises a frequency associated with the base station, or both, the method further comprising: maintaining a connection with the base station based at least in part on selecting the cell associated with the base station, the frequency associated with the base station, or both.

Aspect 14: The method of any of aspects 1 through 13, wherein the at least one operating configuration comprises an SA FDD mode, an SA TDD mode, an FDD and TDD carrier aggregation mode, an NSA mode, a shared resource mode in which one or both of a time resource or a frequency resource are shared by multiple RATs, or any combination thereof.

Aspect 15: The method of any of aspects 1 through 14, wherein receiving the bandwidth size indication comprises: receiving, from the base station, the bandwidth size indication that indicates a plurality of bandwidth sizes configured for each operating configuration of the plurality of operating configurations supported at the UE.

Aspect 16: The method of any of aspects 1 through 15, wherein transmitting the priority indication comprises: transmitting, to the base station, the priority indication for the at least one operating configuration corresponding to a bandwidth size of the at least one operating configuration satisfying a power consumption criterion, an overheating criterion, or both.

Aspect 17: The method of any of aspects 1 through 16, wherein transmitting the priority indication comprises: transmitting the priority indication that indicates a higher priority for a first operation configuration of the plurality of operating configurations that has a first BWP comprising an SSB than a second operation configuration of the plurality of operating configurations that has a second BWP without an SSB.

Aspect 18: A method for wireless communication at a base station, comprising: transmitting, to a UE, a bandwidth size indication that indicates a respective bandwidth size configured for each operating configuration of a plurality of operating configurations; receiving, from the UE, a priority indication for at least one operating configuration of the plurality of operating configurations based at least in part on the bandwidth size indication, the priority indication corresponding to a bandwidth size of the at least one operating configuration satisfying a service latency criterion, a throughput criterion, or both, for data traffic; transmitting, to the UE, a configuration indication that indicates to communicate according to a first operating configuration of the plurality of operating configurations based at least in part on the priority indication for the at least one operating configuration; and communicating the data traffic with the UE based at least in part on the first operating configuration.

Aspect 19: The method of aspect 18, wherein receiving the priority indication comprises: receiving the priority indication that indicates a relative priority among each operating configuration of the plurality of operating configurations.

Aspect 20: The method of any of aspects 18 through 19, wherein receiving the priority indication comprises: receiving the priority indication that indicates a first priority for the first operating configuration when the UE is in a connected mode, a second priority for the first operating configuration when the UE is in an idle mode or an inactive mode, or both.

Aspect 21: The method of any of aspects 18 through 20, wherein receiving the priority indication comprises: receiving the priority indication that indicates a first relative priority among each operating configuration of the plurality of operating configurations when the UE is in a connected mode, a second relative priority among each operating configuration of the plurality of operating configurations when the UE is in an idle mode or an inactive mode, or both.

Aspect 22: The method of any of aspects 18 through 21, wherein receiving the priority indication comprises: receiving an RRC setup request message, an RRC resume request message, or a measurement report that comprises the priority indication.

Aspect 23: The method of any of aspects 18 through 22, wherein transmitting the configuration indication comprises: transmitting an RRC setup message, an RRC resume message, or an RRC reconfiguration message that comprises the configuration indication.

Aspect 24: The method of any of aspects 18 through 23, wherein receiving the priority indication comprises: receiving RRC signaling comprising the priority indication.

Aspect 25: The method of any of aspects 18 through 24, wherein transmitting the configuration indication comprises: transmitting the configuration indication that indicates to communicate according to the first operating configuration that is the at least one operating configuration, wherein the first operating configuration has a highest priority among each operating configuration of the plurality of operating configurations.

Aspect 26: The method of any of aspects 18 through 25, wherein the at least one operating configuration comprises two or more operating configurations, and wherein transmitting the configuration indication comprises: transmitting the configuration indication that indicates to communicate according to the first operating configuration that is one of the two or more operating configurations, and wherein a second operating configuration of the two or more operating configurations has a higher priority than the first operating configuration.

Aspect 27: The method of any of aspects 18 through 26, further comprising: transmitting the configuration indication that indicates to communicate according to the first operating configuration based at least in part on the second operating configuration being unsupported at the base station.

Aspect 28: The method of any of aspects 18 through 27, wherein the at least one operating configuration comprises an SA FDD mode, an SA TDD mode, an FDD and TDD carrier aggregation mode, an NSA mode, a shared resource mode in which one or both of a time resource or a frequency resource are shared by multiple RATs, or any combination thereof.

Aspect 29: The method of any of aspects 18 through 28, wherein transmitting the bandwidth size indication comprises: transmitting, to the UE, the bandwidth size indication that indicates a plurality of bandwidth sizes configured for each operating configuration of the plurality of operating configurations supported at the UE.

Aspect 30: The method of any of aspects 18 through 29, wherein receiving the priority indication comprises: receiving, from the UE, the priority indication for the at least one operating configuration corresponding to a bandwidth size of the at least one operating configuration satisfying a power consumption criterion, an overheating criterion, or both.

Aspect 31: The method of any of aspects 18 through 30, wherein receiving the priority indication comprises: receiving the priority indication that indicates a higher priority for a first operation configuration of the plurality of operating configurations that has a first BWP comprising an SSB than a second operation configuration of the plurality of operating configurations that has a second BWP without an SSB.

Aspect 32: An apparatus for wireless communication at a UE, comprising a processor; memory coupled with the processor; and instructions stored in the memory and executable by the processor to cause the apparatus to perform a method of any of aspects 1 through 17.

Aspect 33: An apparatus for wireless communication at a UE, comprising at least one means for performing a method of any of aspects 1 through 17.

Aspect 34: A non-transitory computer-readable medium storing code for wireless communication at a UE, the code comprising instructions executable by a processor to perform a method of any of aspects 1 through 17.

Aspect 35: An apparatus for wireless communication at a base station, comprising a processor; memory coupled with the processor; and instructions stored in the memory and executable by the processor to cause the apparatus to perform a method of any of aspects 18 through 31.

Aspect 36: An apparatus for wireless communication at a base station, comprising at least one means for performing a method of any of aspects 18 through 31.

Aspect 37: A non-transitory computer-readable medium storing code for wireless communication at a base station, the code comprising instructions executable by a processor to perform a method of any of aspects 18 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity, a bandwidth size indication that indicates a respective bandwidth size configured for each operating configuration of a plurality of operating configurations supported at the UE, wherein the plurality of operating configurations comprises a first operating configuration comprising a non-shared resource mode and a second operating configuration comprising a shared resource mode in which one or both of a time resource or a frequency resource are shared by multiple radio access technologies;

transmitting, to the network entity, a priority indication prioritizing the second operating configuration over the first operating configuration based at least in part on the bandwidth size indication, the priority indication indicating a priority of the second operating configuration for communicating data traffic, and the priority indication corresponding to a bandwidth size of the second operating configuration satisfying a service latency criterion, a throughput criterion, or both, for the data traffic;

receiving, from the network entity, a configuration indication that indicates to communicate according to a selected operating configuration of the plurality of operating configurations based at least in part on the priority indication for the second operating configuration comprising the shared resource mode; and communicating the data traffic with the network entity based at least in part on the selected operating configuration.

2. The method of claim 1, wherein transmitting the priority indication comprises:
transmitting the priority indication that indicates a relative priority among each operating configuration of the plurality of operating configurations.

3. The method of claim 1, wherein transmitting the priority indication comprises:
transmitting the priority indication that indicates a first priority for the selected operating configuration when the UE is in a connected mode, a second priority for the selected operating configuration when the UE is in an idle mode or an inactive mode, or both.

4. The method of claim 1, wherein transmitting the priority indication comprises:
transmitting the priority indication that indicates a first relative priority among each operating configuration of the plurality of operating configurations when the UE is in a connected mode, a second relative priority among each operating configuration of the plurality of operating configurations when the UE is in an idle mode or an inactive mode, or both.

5. The method of claim 1, wherein transmitting the priority indication comprises:
transmitting a radio resource control setup request message, a radio resource control resume request message, or a measurement report that comprises the priority indication.

6. The method of claim 1, wherein receiving the configuration indication comprises:
receiving a radio resource control setup message, a radio resource control resume message, or a radio resource control reconfiguration message that comprises the configuration indication.

7. The method of claim 1, wherein transmitting the priority indication comprises:
transmitting radio resource control signaling comprising the priority indication.

8. The method of claim 1, wherein receiving the configuration indication comprises:
receiving the configuration indication that indicates to communicate according to the selected operating configuration that is the second operating configuration, wherein the selected operating configuration has a highest priority among each operating configuration of the plurality of operating configurations.

9. The method of claim 1, wherein the second operating configuration comprises two or more operating configurations, and wherein receiving the configuration indication comprises:
receiving the configuration indication that indicates to communicate according to the selected operating configuration that is one of the two or more operating configurations, and wherein a third operating configuration of the two or more operating configurations has a higher priority than the selected operating configuration.

10. The method of claim 1, wherein the UE transmits the priority indication when in a connected mode.

11. The method of claim 1, further comprising:
switching from connected mode to an idle mode or an inactive mode;
identifying one or more frequencies, one or more cells, or both based at least in part on the switching; and
selecting one of the one or more frequencies, one of the one or more cells, or both based at least in part on priority information associated with the priority indication.

12. The method of claim 11, wherein the one of the one or more cells comprises a cell associated with a second network entity, the one of the one or more frequencies comprises a frequency associated with the second network entity, or both, the method further comprising:
initiating communications with the second network entity based at least in part on selecting the cell associated with the second network entity, the frequency associated with the second network entity, or both.

13. The method of claim 11, wherein the one of the one or more cells comprises a cell associated with the network entity, the one of the one or more frequencies comprises a frequency associated with the network entity, or both, the method further comprising:
maintaining a connection with the network entity based at least in part on selecting the cell associated with the network entity, the frequency associated with the network entity, or both.

14. The method of claim 1, wherein the plurality of operating configurations comprise a standalone frequency division duplexing mode, a standalone time division duplexing mode, a frequency division duplexing and time division duplexing carrier aggregation mode, a non-standalone mode, the shared resource mode in which one or both of a time resource or a frequency resource are shared by multiple radio access technologies, or any combination thereof.

15. The method of claim 1, wherein receiving the bandwidth size indication comprises:
receiving, from the network entity, the bandwidth size indication that indicates a plurality of bandwidth sizes configured for each operating configuration of the plurality of operating configurations supported at the UE.

16. The method of claim 1, wherein transmitting the priority indication comprises:
transmitting, to the network entity, the priority indication for the second operating configuration corresponding to a bandwidth size of the second operating configuration satisfying a power consumption criterion, an overheating criterion, or both.

17. The method of claim 1, wherein transmitting the priority indication comprises:

transmitting the priority indication that indicates a higher priority for a first operation configuration of the plurality of operating configurations that has a first bandwidth part comprising a synchronization signal block than a second operation configuration of the plurality of operating configurations that has a second bandwidth part without a synchronization signal block.

18. A method for wireless communication at network entity, comprising:
   transmitting, to a user equipment (UE), a bandwidth size indication that indicates a respective bandwidth size configured for each operating configuration of a plurality of operating configurations, wherein the plurality of operating configurations comprises a first operating configuration comprising a non-shared resource mode and a second operating configuration comprising a shared resource mode in which one or both of a time resource or a frequency resource are shared by multiple radio access technologies;
   receiving, from the UE, a priority indication prioritizing the second operating configuration over the first operating configuration based at least in part on the bandwidth size indication, the priority indication indicating a priority of the second operating configuration for communicating data traffic, and the priority indication corresponding to a bandwidth size of the second operating configuration satisfying a service latency criterion, a throughput criterion, or both, for the data traffic;
   transmitting, to the UE, a configuration indication that indicates to communicate according to a selected operating configuration of the plurality of operating configurations based at least in part on the priority indication for the second operating configuration comprising the shared resource mode; and
   communicating the data traffic with the UE based at least in part on the selected operating configuration.

19. The method of claim 18, wherein receiving the priority indication comprises:
   receiving the priority indication that indicates a relative priority among each operating configuration of the plurality of operating configurations.

20. The method of claim 18, wherein receiving the priority indication comprises:
   receiving the priority indication that indicates a first priority for the selected operating configuration when the UE is in a connected mode, a second priority for the selected operating configuration when the UE is in an idle mode or an inactive mode, or both.

21. The method of claim 18, wherein receiving the priority indication comprises:
   receiving the priority indication that indicates a first relative priority among each operating configuration of the plurality of operating configurations when the UE is in a connected mode, a second relative priority among each operating configuration of the plurality of operating configurations when the UE is in an idle mode or an inactive mode, or both.

22. The method of claim 18, wherein receiving the priority indication comprises:
   receiving a radio resource control setup request message, a radio resource control resume request message, or a measurement report that comprises the priority indication.

23. The method of claim 18, wherein transmitting the configuration indication comprises:
   transmitting a radio resource control setup message, a radio resource control resume message, or a radio resource control reconfiguration message that comprises the configuration indication.

24. The method of claim 18, wherein receiving the priority indication comprises:
   receiving radio resource control signaling comprising the priority indication.

25. The method of claim 18, wherein transmitting the configuration indication comprises:
   transmitting the configuration indication that indicates to communicate according to the selected operating configuration that is the second operating configuration, wherein the selected operating configuration has a highest priority among each operating configuration of the plurality of operating configurations.

26. The method of claim 18, wherein the second operating configuration comprises two or more operating configurations, and wherein transmitting the configuration indication comprises:
   transmitting the configuration indication that indicates to communicate according to the selected operating configuration that is one of the two or more operating configurations, and wherein a third operating configuration of the two or more operating configurations has a higher priority than the selected operating configuration.

27. The method of claim 18, further comprising:
   transmitting the configuration indication that indicates to communicate according to the selected operating configuration based at least in part on a second operating configuration being unsupported at the network entity.

28. The method of claim 18, wherein the plurality of operating configurations comprise a standalone frequency division duplexing mode, a standalone time division duplexing mode, a frequency division duplexing and time division duplexing carrier aggregation mode, a non-standalone mode, the shared resource mode in which one or both of a time resource or a frequency resource are shared by multiple radio access technologies, or any combination thereof.

29. A user equipment (UE) for wireless communication, comprising:
   one or more memories storing processor-executable code; and one or more processors coupled with the one or more memories and individually or collectively operable to execute the code to cause the UE to:
   receive, from a network entity, a bandwidth size indication that indicates a respective bandwidth size configured for each operating configuration of a plurality of operating configurations supported at the UE, wherein the plurality of operating configurations comprises a first operating configuration comprising a non-shared resource mode and a second operating configuration comprising a shared resource mode in which one or both of a time resource or a frequency resource are shared by multiple radio access technologies;
   transmit, to the network entity, a priority indication prioritizing the second operating configuration over the first operating configuration based at least in part on the bandwidth size indication, the priority indication indicating a priority of the second operating configuration for communicating data traffic, and the priority indication corresponding to a bandwidth size of the second operating configuration satisfying a service latency criterion, a throughput criterion, or both, for the data traffic;
   receive, from the network entity, a configuration indication that indicates to communicate according to a selected operating configuration of the plurality of operating configurations based at least in part on the priority indication for the second operating configuration comprising the shared resource mode; and communicate the data traffic with the network entity based at least in part on the selected operating configuration.

30. A network entity for wireless communication, comprising:

one or more memories storing processor-executable code; and one or more processors coupled with the one or more memories and individually or collectively operable to execute the code to cause the network entity to:

transmit, to a user equipment (UE), a bandwidth size indication that indicates a respective bandwidth size configured for each operating configuration of a plurality of operating configurations, wherein the plurality of operating configurations comprises a first operating configuration comprising a non-shared resource mode and a second operating configuration comprising a shared resource mode in which one or both of a time resource or a frequency resource are shared by multiple radio access technologies;

receive, from the UE, a priority indication prioritizing the second operating configuration over the first operating configuration based at least in part on the bandwidth size indication, the priority indication indicating a priority of the second operating configuration for communicating data traffic, and the priority indication corresponding to a bandwidth size of the second operating configuration satisfying a service latency criterion, a throughput criterion, or both, for the data traffic;

transmit, to the UE, a configuration indication that indicates to communicate according to a selected operating configuration of the plurality of operating configurations based at least in part on the priority indication for the second operating configuration comprising the shared resource mode; and communicate the data traffic with the UE based at least in part on the selected operating configuration.

* * * * *